US012735657B2

(12) United States Patent
Lo et al.

(10) Patent No.: US 12,735,657 B2
(45) Date of Patent: Sep. 15, 2026

(54) STABILIZED ENZYMATIC DETERGENT COMPOSITIONS

(71) Applicant: ECOLAB USA INC., Saint Paul, MN (US)

(72) Inventors: Wendy Lo, Saint Paul, MN (US); David Riehm, Saint Paul, MN (US); Erik C. Olson, Saint Paul, MN (US); Sarah Cronin, Saint Paul, MN (US); Michael S. Rischmiller, Saint Paul, MN (US); Carter M. Silvernail, Saint Paul, MN (US); Devon Beau Hammel, Saint Paul, MN (US); Jack Lehman, Saint Paul, MN (US); Jesse Ray Murphy, Saint Paul, MN (US)

(73) Assignee: ECOLAB USA INC., Saint Paul, MN (US)

(*) Notice: Subject to any disclaimer, the term of this patent is extended or adjusted under 35 U.S.C. 154(b) by 24 days.

(21) Appl. No.: 16/948,765

(22) Filed: Sep. 30, 2020

(65) Prior Publication Data

US 2021/0095231 A1 Apr. 1, 2021

Related U.S. Application Data

(60) Provisional application No. 62/907,931, filed on Sep. 30, 2019.

(51) Int. Cl.

| | |
|---|---|
| ***C11D 3/386*** | (2006.01) |
| ***C11D 1/72*** | (2006.01) |

(Continued)

(52) U.S. Cl.

CPC ............ *C11D 3/38618* (2013.01); *C11D 1/72* (2013.01); *C11D 3/044* (2013.01); *C11D 3/10* (2013.01);

(Continued)

(58) Field of Classification Search

CPC ....... C11D 3/38618; C11D 1/72; C11D 3/044; C11D 3/10; C11D 3/2048; C11D 3/2065;

(Continued)

(56) References Cited

U.S. PATENT DOCUMENTS

| | | |
|---|---|---|
| 3,296,094 A | 1/1967 | Cayle |
| 3,761,420 A | 9/1973 | Bogardus |

(Continued)

FOREIGN PATENT DOCUMENTS

| | | |
|---|---|---|
| AU | 2011218662 B2 | 9/2011 |
| BR | 8603478 A | 3/1987 |

(Continued)

OTHER PUBLICATIONS

Google Patents Translation of CN 107922894 A (Year: 2018).*

(Continued)

*Primary Examiner* — Angela C Brown-Pettigrew
*Assistant Examiner* — Preeti Kumar
(74) *Attorney, Agent, or Firm* — McKee, Voorhees & Sease, PLC

(57) ABSTRACT

The present disclosure relates to a stable, low-foaming enzymatic detergent compositions and methods of making and using the same. In a preferred embodiment, the enzymatic detergent compositions are particularly useful for cleaning medical and dental instruments. In a preferred embodiment, the enzymatic detergent compositions demonstrate stability after storage for at least about 4 weeks and at temperatures greater than room temperature.

18 Claims, 5 Drawing Sheets
(4 of 5 Drawing Sheet(s) Filed in Color)

(51) Int. Cl.

| | |
|---|---|
| ***C11D 3/04*** | (2006.01) |
| ***C11D 3/10*** | (2006.01) |
| ***C11D 3/20*** | (2006.01) |
| ***C11D 3/30*** | (2006.01) |
| ***C11D 3/34*** | (2006.01) |
| ***C11D 3/37*** | (2006.01) |
| ***C11D 17/00*** | (2006.01) |

(52) U.S. Cl.
CPC .......... *C11D 3/2048* (2013.01); *C11D 3/2065* (2013.01); *C11D 3/2082* (2013.01); *C11D 3/30* (2013.01); *C11D 3/349* (2013.01); *C11D 3/3707* (2013.01); *C11D 3/38627* (2013.01); *C11D 17/0008* (2013.01); *C11D 2111/16* (2024.01); *C11D 2111/18* (2024.01)

(58) Field of Classification Search
CPC ......... C11D 3/2082; C11D 3/30; C11D 3/349; C11D 3/3707; C11D 3/38627; C11D 11/0029; C11D 11/0035; C11D 17/0008; C11D 3/0026; C11D 3/2041; C11D 7/261; C11D 11/0041; C11D 3/38663
See application file for complete search history.

(56) References Cited

U.S. PATENT DOCUMENTS

| | | | | |
|---|---|---|---|---|
| 4,238,345 | A * | 12/1980 | Guilbert | C11D 3/0084 510/108 |
| 4,243,543 | A | 1/1981 | Guilbert et al. | |
| 4,378,429 | A | 3/1983 | Modrovich | |
| 4,404,115 | A | 9/1983 | Tai | |
| 4,409,326 | A | 10/1983 | Modrovich | |
| 4,518,694 | A | 5/1985 | Shaer | |
| 4,548,727 | A | 10/1985 | Shaer | |
| 4,707,287 | A | 11/1987 | Herdeman | |
| 4,744,979 | A * | 5/1988 | Osipow | A61K 8/046 424/73 |
| 4,797,362 | A | 1/1989 | Takeuchi et al. | |
| 4,994,200 | A | 2/1991 | Disch et al. | |
| 5,281,277 | A | 1/1994 | Nakagawa et al. | |
| 5,281,355 | A | 1/1994 | Tsaur et al. | |
| 5,281,356 | A | 1/1994 | Tsaur et al. | |
| 5,415,796 | A | 5/1995 | van Buskirk et al. | |
| 5,614,484 | A | 3/1997 | Panandiker | |
| 5,780,283 | A | 7/1998 | Lee | |
| 5,814,502 | A | 9/1998 | Hoeltke et al. | |
| 5,858,117 | A | 1/1999 | Oakes et al. | |
| 5,905,037 | A | 5/1999 | Cooney, Jr. et al. | |
| 5,948,738 | A | 9/1999 | Chowhan et al. | |
| 5,998,342 | A | 12/1999 | Scoville, Jr. et al. | |
| 6,133,227 | A | 10/2000 | Barnabas et al. | |
| 6,191,092 | B1 | 2/2001 | Bragulla et al. | |
| 6,214,596 | B1 | 4/2001 | Asgharian et al. | |
| 6,342,381 | B1 | 1/2002 | Jaquess | |
| 6,652,766 | B1 | 11/2003 | Frankenbach et al. | |
| 6,669,963 | B1 | 12/2003 | Kampinga | |
| 7,109,013 | B2 | 9/2006 | Koga et al. | |
| 7,157,416 | B2 | 1/2007 | Becker et al. | |
| 7,939,488 | B2 * | 5/2011 | Scheuing | C11D 1/83 510/342 |
| 7,977,080 | B2 | 7/2011 | Gramatikova et al. | |
| 8,592,359 | B2 | 11/2013 | Siegert et al. | |
| 8,753,858 | B2 | 6/2014 | Qian et al. | |
| 8,865,449 | B2 | 10/2014 | Aehle et al. | |
| 9,334,467 | B2 | 5/2016 | Shaw et al. | |
| 9,695,461 | B2 | 7/2017 | Siegert et al. | |
| 9,914,964 | B2 | 3/2018 | Angrish et al. | |
| 10,221,377 | B2 | 3/2019 | Valtakari et al. | |
| 10,865,363 | B2 * | 12/2020 | Foster | C11D 3/3418 |
| 11,155,769 | B2 * | 10/2021 | Ellingson | C11D 1/825 |
| 2003/0087787 | A1 | 5/2003 | Man et al. | |
| 2003/0100464 | A1 | 5/2003 | Kott et al. | |
| 2006/0073537 | A1 | 4/2006 | Cairns et al. | |
| 2007/0111920 | A1 | 5/2007 | Baur et al. | |
| 2008/0025960 | A1 | 1/2008 | Kumar et al. | |
| 2008/0293610 | A1 | 11/2008 | Shaw et al. | |
| 2009/0111161 | A1 | 4/2009 | Jones et al. | |
| 2009/0218541 | A1 | 9/2009 | Wehner et al. | |
| 2011/0014676 | A1 | 1/2011 | Cowan et al. | |
| 2012/0227120 | A1 | 9/2012 | Hitchman et al. | |
| 2013/0189197 | A1 | 7/2013 | Maruyama | |
| 2013/0260407 | A1 | 10/2013 | Alonso Rodriguez et al. | |
| 2015/0361511 | A1 | 12/2015 | Lee et al. | |
| 2017/0051234 | A1 * | 2/2017 | Foster | C11D 3/3707 |
| 2017/0152462 | A1 | 6/2017 | Baltsen et al. | |
| 2018/0044618 | A1 | 2/2018 | Frieze | |
| 2018/0066213 | A1 * | 3/2018 | Lo | C11D 3/386 |
| 2018/0163203 | A1 | 6/2018 | Bennett et al. | |
| 2018/0216040 | A1 | 8/2018 | Baltsen et al. | |
| 2018/0298368 | A1 | 10/2018 | Raab et al. | |
| 2019/0100738 | A1 | 4/2019 | Han | |
| 2019/0161707 | A1 | 5/2019 | Vejborg et al. | |
| 2019/0185829 | A1 | 6/2019 | Wang et al. | |
| 2019/0194259 | A1 | 6/2019 | Harel et al. | |
| 2019/0276773 | A1 * | 9/2019 | Olson | C11D 3/38645 |

FOREIGN PATENT DOCUMENTS

| | | | | |
|---|---|---|---|---|
| BR | 8801839 | A | 11/1988 | |
| BR | 9408185 | A | 5/1997 | |
| CA | 2197314 | A1 | 3/1996 | |
| CA | 2385696 | C | 4/2001 | |
| CA | 2483570 | A1 | 4/2006 | |
| CN | 87105787 | A | 5/1988 | |
| CN | 101781639 | A | 7/2010 | |
| CN | 1906303 | B | 6/2013 | |
| CN | 103131557 | A | 6/2013 | |
| CN | 102239264 | B | 11/2013 | |
| CN | 103740690 | A | 4/2014 | |
| CN | 102994488 | B | 10/2014 | |
| CN | 104152431 | A | 11/2014 | |
| CN | 104350153 | A | 2/2015 | |
| CN | 102628863 | B | 5/2016 | |
| CN | 105936900 | A | 9/2016 | |
| CN | 106635494 | A | 5/2017 | |
| CN | 106834261 | A | 6/2017 | |
| CN | 104479909 | B | 7/2017 | |
| CN | 107254374 | A | 10/2017 | |
| CN | 105087536 | B | 4/2018 | |
| CN | 107922894 | A * | 4/2018 | C11D 1/66 |
| CN | 108300606 | A | 7/2018 | |
| CN | 108441342 | A | 8/2018 | |
| CN | 104169411 | B | 1/2019 | |
| DE | 3623942 | A1 | 4/1987 | |
| DE | 4226162 | A1 | 2/1993 | |
| DE | 4341113 | A1 | 6/1995 | |
| EP | 0348183 | A2 | 12/1989 | |
| EP | 0702712 | B1 | 12/1998 | |
| EP | 1373452 | B1 | 1/2006 | |
| EP | 0906417 | B1 | 4/2008 | |
| EP | 1009759 | B1 | 5/2008 | |
| EP | 1035836 | B1 | 6/2009 | |
| EP | 1699921 | B1 | 11/2009 | |
| EP | 1261368 | B1 | 4/2010 | |
| EP | 2277860 | A1 * | 1/2011 | A61K 38/4833 |
| EP | 2305713 | A1 | 4/2011 | |
| EP | 2716644 | B1 | 4/2017 | |
| EP | 2111426 | B1 | 10/2017 | |
| EP | 2914246 | B1 | 3/2019 | |
| EP | 3298115 | B1 | 3/2019 | |
| EP | 3656838 | A1 | 5/2020 | |
| GB | 1232627 | | 5/1971 | |
| GB | 1552032 | | 9/1979 | |
| GB | 2021142 | B | 9/1982 | |
| IN | 01247MAS1995 | | 9/1998 | |
| IN | 217073 | | 5/2007 | |
| IN | 257598 | | 8/2007 | |
| IN | 200602866 | | 8/2007 | |
| IN | 279898 | | 11/2009 | |
| IN | 200904966 | | 11/2009 | |
| IN | 201001212 | | 7/2010 | |
| IN | 200902135 | | 8/2010 | |

(56) References Cited

FOREIGN PATENT DOCUMENTS

| | | | | |
|---|---|---|---|---|
| IN | 201100774 | | 5/2011 | |
| IN | 201109996 | | 2/2013 | |
| IN | 201500167 | | 7/2016 | |
| IN | 201737010833 | | 8/2017 | |
| IN | 201947027165 | | 7/2019 | |
| JP | 200449112 | A | 2/2004 | |
| JP | 2006271257 | A | 10/2006 | |
| JP | 4013108 | B2 | 11/2007 | |
| JP | 4341809 | B2 | 10/2009 | |
| JP | 2010233531 | A | 10/2010 | |
| JP | 5520828 | B2 | 6/2014 | |
| KR | 1020100101563 | A | 9/2010 | |
| KR | 1020150059580 | A | 6/2015 | |
| KR | 101925429 | B1 | 12/2018 | |
| SG | 176253 | A1 | 12/2011 | |
| WO | 8907642 | A1 | 8/1989 | |
| WO | 9206150 | A1 | 4/1992 | |
| WO | 9206153 | A1 | 4/1992 | |
| WO | 9500635 | A1 | 1/1995 | |
| WO | 9742293 | A1 | 11/1997 | |
| WO | 9841188 | A3 | 9/1998 | |
| WO | 9847993 | A1 | 10/1998 | |
| WO | 9927907 | A1 | 6/1999 | |
| WO | WO-0024858 | A1 * | 5/2000 | ............ D06M 15/03 |
| WO | 0043479 | A1 | 7/2000 | |
| WO | 0202727 | A1 | 1/2002 | |
| WO | 0208398 | A2 | 1/2002 | |
| WO | 02068562 | A2 | 9/2002 | |
| WO | 2007044993 | A2 | 4/2007 | |
| WO | 2008116468 | A3 | 10/2008 | |
| WO | 2009030632 | A1 | 3/2009 | |
| WO | 2009115392 | A1 | 9/2009 | |
| WO | 2010010343 | A1 | 1/2010 | |
| WO | 2010138522 | | 12/2010 | |
| WO | 2015042202 | A1 | 3/2015 | |
| WO | 2015077660 | A1 | 5/2015 | |
| WO | 2016191238 | A1 | 12/2016 | |
| WO | 2018085551 | A3 | 5/2018 | |
| WO | 2018121398 | A1 | 7/2018 | |
| WO | 2018136082 | A1 | 7/2018 | |

OTHER PUBLICATIONS

Linard et al., "Enzyme-Containing Heavy Duty Liquid Detergent", U.S. Statutory Invention Registration No. H1,776, 9 pages, published Jan. 5, 1999.

Kravetz et al., "Effect of Surfactant Structure on Stability of Enzymes Formulated into Laundry Liquids", Journal of the American Oil Chemists' Society, vol. 62, No. 5, pp. 943-949, May 1985.

Singh et al., "Comparative interaction study of amylase and surfactants for potential detergent formulation", Journal of Molecular Liquids, vol. 261, pp. 397-401, Apr. 9, 2018.

Zhang et al., "Study on the interaction of alkaline protease with main surfactants in detergent", Colloid Polym. Sci., vol. 294, pp. 247-255, 2016.

International Searching Authority in connection with PCT/US2020/053491 filed Sep. 30, 2020, "The International Search Report and the Written Opinion of the International Searching Authority, or the Declaration", 14 pages, mailed Dec. 16, 2020.

* cited by examiner

| Formula | 5 min | 10 min | 15 min | 20 min | 25 min | 30 min |
|---|---|---|---|---|---|---|
| Exemplary Formula 2 (2000 ppm) |  |  |  |  |  |  |
| Exemplary Formula 2 (4000 ppm) |  |  |  |  |  |  |
| Prolystica 2X (2000 ppm) |  |  |  |  |  |  |
| Prolystica 2X (4000 ppm) |  |  |  |  |  |  |

STABILIZED ENZYMATIC DETERGENT COMPOSITIONS

CROSS-REFERENCE

This application is related to and claims priority under 35 U.S.C. § 119 to U.S. Provisional Application Ser. No. 62/907,931 filed on Sep. 30, 2019 and entitled "STABILIZED ENZYMATIC DETERGENT COMPOSITIONS"; the entire contents of this patent application are hereby expressly incorporated herein by reference.

TECHNICAL FIELD

The disclosure relates to low-foaming, stabilized enzymatic detergent compositions and methods of making and using the same.

BACKGROUND

Medical and dental instruments must be thoroughly cleaned and sanitized before being reused. Cleaning processes include multiple steps, some of which may be automated and some of which may be manual. The instruments cleaned may be heavily soiled with blood, protein and fat based soils, or sharp, small or irregular shaped. The process of washing and disinfecting becomes complicated when blood or other soils dry on the instruments. The body fluids, such as blood, lipids and synovial fluids from joints adhere to the items used during a procedure. As these fluids dry, the adhesion gets stronger and the fluids get harder to dissolve using ordinary cleaning methods. Blood, in particular, becomes much more difficult to remove once it has dried. Enzymes can help break these soils down.

Use of enzymes in such detergent compositions has proven difficult due to stability problems. The stability problems suffered are exacerbated over time and with storage or transport conditions above room temperature. Historically, borate-based stabilization systems have been employed in attempt to address the stability of enzyme formations. However, this is insufficient for at least two reasons. First, borate-including compositions are under scrutiny and regulations have been proposed limiting their incorporation and they may be excluded entirely. Second, the borate-based compositions did not provide the desired level of stability. Other attempts to incorporate enzymes in detergent compositions has included the use of ingredients that have undesirous effects. For example, U.S. Pat. No. 8,921,295 describes detergents that can include an enzyme, but to maintain the stability of the compositions, amine oxides and/or alkyl polyglucosides are required. These ingredients are problematic though as they are foaming. In many cleaning contexts, including in particular, medical and dental instrument cleaning, there is a need for the detergent compositions to minimize foam so that the surface being cleaned remains visible and some cleaning equipment is not compatible with foam. Thus, there is a need to improve enzymatic detergent compositions.

Accordingly, there is a need to develop enzymatic detergent compositions which are stable over time and under temperature conditions greater than room temperature which do not include borate. Further, there is a need for compositions that provide better stabilization than borate-based compositions.

Accordingly, it is an objective of the claimed invention to develop enzymatic detergent compositions which are stable over time and under temperature conditions greater than room temperature.

A further object of the invention is enzymatic detergent compositions that are borate-free.

Other objects, advantages and features of the detergent compositions and methods will become apparent from the following specification taken in conjunction with the accompanying figures.

BRIEF SUMMARY OF THE PREFERRED EMBODIMENT

An advantage of the enzymatic detergent compositions is that they are shelf stable, retain cleaning efficacy, and provide low-foam during use. In a preferred embodiment, the enzymatic detergent compositions demonstrate shelf stability with retained enzymatic activity when stored at temperatures in excess of room temperature for weeks or even months.

A preferred embodiment is a low-foaming, enzymatic detergent composition comprising a C2-C10 polyol, one or more enzymes, a buffer, and water; wherein the composition provides a pH of between about 6.5 and about 9.5 during use; wherein the composition during use provides about ½ of an inch or less of foam at about 40° C. after about 15 seconds. Preferably, the composition has less than 0.5 wt. % of borate-containing compounds; less than 0.5 wt. % of an amine oxide; and/or less than 0.5 wt. % of an alkyl polyglucoside. In a preferred embodiment, the low-foaming, enzymatic detergent composition is a concentrated composition. In another preferred embodiment, the low-foaming, enzymatic detergent composition is a use solution.

A preferred embodiment is a method of manufacturing an enzymatic detergent composition comprising combining and mixing a C2-C10 polyol, one or more enzymes, a buffer, and water, and any optional ingredients. In a preferred embodiment, the one or more enzymes are combined and mixed last.

Another preferred embodiment is found in a method of cleaning a surface comprising (a) diluting a concentrated, enzymatic detergent composition comprising a C2-C10 polyol, one or more enzymes, a buffer, and water to form a cleaning solution; (b) contacting a surface with the cleaning solution; wherein the contacting step is performed at a temperature between about 50° F. and about 180° F.; and (c) rinsing with water.

Another preferred embodiment is found in a method of cleaning a medical and/or dental instrument comprising (a) diluting a concentrated, enzymatic detergent composition comprising a C2-C10 polyol, one or more enzymes, a buffer, and water to form a cleaning solution; (b) contacting the instrument with the cleaning solution; wherein the contacting step is performed at a temperature between about 60° F. and about 150° F.; and (c) rinsing with water.

Another preferred embodiment is found in a method of cleaning a ware comprising (a) diluting a concentrated, enzymatic detergent composition comprising a C2-C10 polyol, one or more enzymes, a buffer, and water to form a cleaning solution; (b) contacting the ware with the cleaning solution; wherein the contacting step is performed at a temperature between about 50° F. and about 150° F.; and (c) rinsing with water.

While multiple embodiments are disclosed, still other embodiments of the present invention will become apparent to those skilled in the art from the following detailed description, which shows and describes illustrative embodiments of the invention. Accordingly, the figures and detailed description are to be regarded as illustrative in nature and not restrictive.

BRIEF DESCRIPTION OF THE DRAWINGS

The patent or application file contains at least one figure executed in color. Copies of this patent or patent application publication with color drawing(s) will be provided by the Office upon request and payment of the necessary fee.

Figure 1:
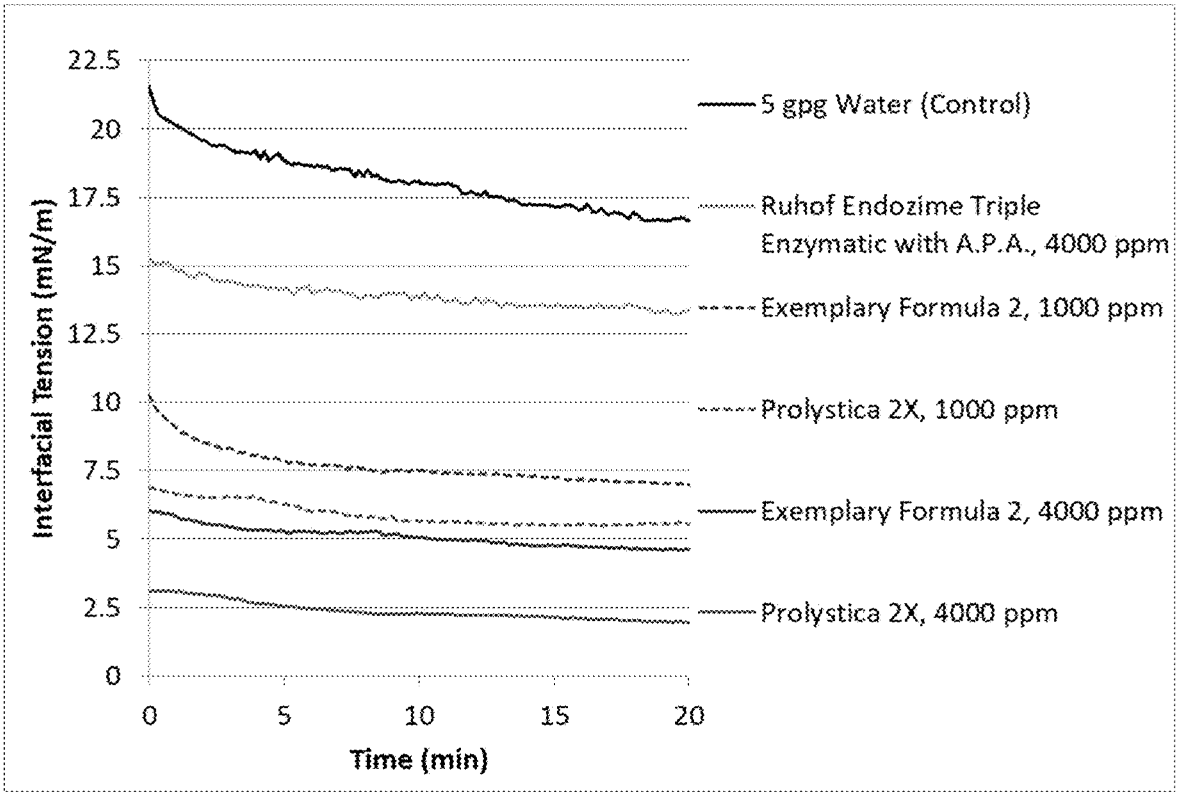
FIG. 1 shows oil-water interfacial tension data with respect to time comparing various commercial enzymatic detergent compositions with an exemplary detergent composition of the present invention.

Various embodiments of the enzymatic detergent compositions, methods of use, and methods of manufacture are described herein. Reference to various embodiments does not limit the scope of the invention. Figures represented herein are not limitations to the various embodiments according to the invention and are presented for exemplary illustration of the invention.

DETAILED DESCRIPTION OF A PREFERRED EMBODIMENT

The present disclosure relates to storage-safe enzymatic detergent compositions, their methods of manufacture, and their methods of use. In a preferred embodiment, the enzymatic cleaning compositions are useful for cleaning medical and/or dental instruments. In a preferred embodiment, the detergent compositions are useful for cleaning ware. The detergent compositions described herein have many advantages over existing detergent compositions, including those for medical and dental instruments. For example, the compositions described herein are stable and the components retain their efficacy upon dilution even after 4 weeks of storage, more preferably after 8 weeks of storage. Further, the compositions described herein are stable and the components retain their efficacy upon dilution even after storage under temperature conditions of 40° C. or greater, and more preferably of 50° C. or greater.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The embodiments of this invention are not limited to particular medical and dental instruments and methods of cleaning the same, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in their SI accepted forms.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

References to elements herein are intended to encompass any or all of their oxidative states and isotopes.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "hard surface" refers to an instrument as defined herein and/or ware as defined herein.

As used herein, the term "instrument" refers to the various medical or dental instruments or devices that can benefit from cleaning with a composition according to the present invention. As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, stethoscopes, arthoscopes, and related equipment, and the like, or combinations thereof.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term "weight percent," "wt. %," "wt-%," "percent by weight," "% by weight," and variations thereof, as used herein, refer to the concentration of a substance as the weight of that substance divided by the total weight of the composition and multiplied by 100.

The methods and compositions described herein may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Enzymatic Detergent Compositions

Described herein are the ingredients and methods of making and using enzymatic detergent compositions. In a preferred embodiment, the enzymatic detergent compositions are liquid. A preferred embodiment of the enzymatic detergent compositions are useful for cleaning medical and dental instruments. In some embodiments, the enzymatic detergent compositions can be used for cleaning other surfaces, such as, ware or other hard surfaces.

The enzymatic detergent compositions comprise a polyol, one or more enzymes, a buffer, and water. Preferably, the enzyme comprises a protease, an amylase, a lipase, or a mixture thereof. Preferably the buffer comprises an alcohol amine, a C1-C6 polycarboxylic acid, or a mixture thereof. Various additional ingredients can be added to the enzymatic detergent compositions. Preferred compositions are described in Tables 1A-1C below. Table 1A provides preferred ranges for an enzymatic detergent composition. Table 1B provides preferred ranges for an enzymatic instrument detergent composition. Table 1 C provides preferred ranges for an enzymatic hard surface detergent composition.

TABLE 1A

Exemplary Enzymatic Detergent Compositions

| | Preferred Formulation (wt. %) | More Preferred Formulation (wt. %) | Most Preferred Formulation (wt. %) |
|---|---|---|---|
| Water | 15-75 | 20-70 | 25-70 |
| Polyol | 0.01-60 | 1-50 | 5-45 |
| Enzyme | 0.1-5 | 0.5-4 | 0.5-3.5 |
| Buffer | 0.1-25 | 0.5-20 | 1-15 |
| Optional ingredients | 0-25 | 0.01-20 | 0.1-20 |

TABLE 1B

Exemplary Enzymatic Instrument Detergent Compositions

| | Preferred Formulation (wt. %) | More Preferred Formulation (wt. %) | Most Preferred Formulation (wt. %) |
|---|---|---|---|
| Water | 15-75 | 20-70 | 25-70 |
| Polyol | 10-60 | 12-50 | 15-45 |
| Enzyme | 0.1-5 | 0.5-4 | 0.5-3.5 |
| Buffer | 0.1-15 | 0.5-12 | 1-10 |
| Optional ingredients | 0-25 | 0.01-20 | 0.1-20 |

TABLE 1C

Exemplary Hard Surface Enzymatic Detergent Compositions

| | Preferred Formulation (wt. %) | More Preferred Formulation (wt. %) | Most Preferred Formulation (wt. %) |
|---|---|---|---|
| Water | 15-75 | 20-70 | 25-70 |
| Polyol | 0.01-25 | 0.1-20 | 0.5-20 |
| Enzyme | 0.1-5 | 0.5-4 | 0.5-3.5 |
| Buffer | 0.1-25 | 0.5-20 | 1-15 |
| Nonionic Surfactant | 0.01-15 | 0.1-12 | 0.5-10 |
| Optional ingredients | 0-25 | 0.01-20 | 0.1-20 |

Preferably, the compositions are liquid. The liquid compositions can be prepared as concentrated liquid compositions, diluted ready to use compositions, a gel, or a combination thereof.

Preferably, the enzymatic detergent compositions dilute to a near neutral pH to moderately alkaline pH. For example, embodiments of the detergent compositions will provide a pH of between about 6 and about 11 upon dilution. In a preferred embodiment, the enzymatic detergents will provide a pH between about 6 and about 11 upon dilution, preferably between about 6 and about 10, more preferably between about 6.5 and about 9.5, most preferably between about 7 and about 9.

Preferably, the enzymatic detergent compositions are low foaming or non-foaming. As used herein, non-foaming means that the composition forms no foam upon dilution, or that it forms foam which breaks in less than 30 seconds, more preferably less than 15 seconds at a temperature between about 50° F. and about 180° F. As used herein, low foaming means that the composition forms foam which breaks in less than 30 seconds, more preferably less than 20 seconds, most preferably less than 15 seconds at a temperature between about 50° F. and about 150° F. As used here, "breaks" refers to a reduction in foam height by at least about 40%, more preferably at least about 60%.

Beneficially, the enzymatic detergent compositions demonstrate shelf stability, such that they can be stored for at least about 2 weeks, preferably for at least about 4 weeks, more preferably at least about 6 weeks, most preferably at least about 8 weeks, while retaining efficacy of the components and such that the liquid composition does not separate during storage. Further, the enzymatic detergent compositions demonstrate shelf stability, such that they can be stored at temperatures greater than room temperature, preferably at least about 40° C., more preferably at least about 45° C., most preferably at least about 50° C., while retaining efficacy of the components and such that the liquid composition does not separate during storage. In a most preferred embodiment, the compositions are stable over periods of at least about 2 weeks, preferably for at least about 4 weeks, more preferably at least about 6 weeks, most preferably at least about 8 weeks under temperature conditions greater than room temperature, preferably at least about 40° C., more preferably at least about 45° C., most preferably at least about 50° C., while retaining efficacy of the components and such that the liquid composition does not separate during storage.

Historically, this has been difficult to achieve. Efforts to maintain stability of enzymes in such detergent compositions has included the use of borate-based stabilizers. Further, efforts to maintain phase stability of the compositions and prevent separation have required the use of amine oxides and/or alkyl polyglucosides, both of which are foaming. A benefit of the enzymatic detergent compositions described herein is that they do not require borate-including ingredients, amine oxides or alkyl polyglucosides. In this respect, the compositions can have less than about 0.5 wt. % of borate-including ingredients, preferably less than about 0.1 wt. % of borate-including ingredients, most preferably less about 0.01 wt. % of borate-including ingredients. A most preferred embodiment is free of borate-including ingredients. Further, the compositions can have less than about 0.5 wt. % of an amine oxide, preferably less than about 0.1 wt. % of an amine oxide, most preferably less about 0.01 wt. % of an amine oxide. A most preferred embodiment is free of an amine oxide. Further, the compositions can have less than about 0.5 wt. % of an alkyl polyglucoside, preferably less than about 0.1 wt. % of an alkyl polyglucoside, most preferably less about 0.01 wt. % of an alkyl polyglucoside. A most preferred embodiment is free of an alkyl polyglucoside. Any one of the aforementioned chemicals can be limited or excluded individually or collectively. For example, the composition can have less than about 0.5 wt. % of a borate-including ingredient and less than 0.1 wt. % of an amine oxide, and be free of an alkyl polyglucoside.

Buffer

The enzymatic detergent compositions comprise a buffer. Preferred buffers include, but are not limited to, alcohol amines, C1-C6 polycarboxylic acids, alkali metal carbonates, bicarbonates, sesquicarbonates, and mixtures thereof. In a preferred embodiment of an enzymatic instrument detergent composition, preferred buffers include, but are not limited to, monoethanol amine, triethanol amine, citric acid, or a mixture thereof. In a preferred embodiment of an enzymatic hard surface detergent composition, preferred buffers include, but are not limited to, alkali metal carbonates, bicarbonates, sesquicarbonates, and mixtures thereof.

The buffer is preferably in an amount between about 0.1 wt. % and about 25 wt. %, more preferably between about 0.5 wt. % and about 20 wt. %, most preferably between about 1 wt. % and about 15 wt. %. In a preferred embodiment of an enzymatic instrument detergent composition comprises a buffer in an amount between about 0.1 wt. % and about 15 wt. %, more preferably between about 0.5 wt. % and about 12 wt. %, and most preferably between about 1 wt. % and about 10 wt. %. In a preferred embodiment of an enzymatic hard surface detergent composition comprises a buffer in an amount between about 0.1 wt. % and about 25 wt. %, more preferably between about 0.5 wt. % and about 20 wt. %, and most preferably between about 1 wt. % and about 15 wt. %.

Enzyme

The enzymatic detergent compositions comprise one or more enzymes. Preferred enzymes include, amylases, cellulases, lipases, proteases, and combinations of the same.

Most preferably, the enzyme comprises two or more of a protease, an amylase, and a lipase. The enzyme is preferably in an amount between about 0.1 wt. % and about 5 wt. %, more preferably between about 0.5 wt. % and about 4 wt. %, most preferably between about 0.5 wt. % and about 3.5 wt. %.

Amylases

Any amylase or mixture of amylases, from any source, can be used in the enzymatic detergent compositions, provided that the selected enzyme is stable in the desired pH range (between about 6 and about 9). For example, the amylase enzymes can be derived from a plant, an animal, or a microorganism such as a yeast, a mold, or a bacterium. Preferred amylase enzymes include, but are not limited to, those derived from a *Bacillus*, such as *B. licheniformis, B. amyloliquefaciens, B. subtilis*, or *B. stearothermophilus*. Amylase enzymes derived from *B. subtilis* are most preferred. The amylase can be purified or a component of a microbial extract, and either wild type or variant (either chemical or recombinant). Preferred amylases are commercially available under the trade name Stainzyme® available from Novozymes.

Cellulases

Any cellulase or mixture of cellulases, from any source, can be used in the enzymatic detergent compositions, provided that the selected enzyme is stable in the desired pH range (between about 6 and about 9). For example, the cellulase enzymes can be derived from a plant, an animal, or a microorganism such as a fungus or a bacterium. Preferred cellulase enzymes include, but are not limited to, those derived from *Humicola insolens, Humicola* strain DSM1800, or a cellulase 212-producing fungus belonging to the genus *Aeromonas* and those extracted from the hepatopancreas of a marine mollusk, *Dolabella Auricula Solander*. The cellulase can be purified or a component of a microbial extract, and either wild type or variant (either chemical or recombinant).

Lipases

Any lipase or mixture of lipases, from any source, can be used in the enzymatic detergent compositions, provided that the selected enzyme is stable in the desired pH range (between about 6 and about 9). For example, the lipase enzymes can be derived from a plant, an animal, or a microorganism such as a fungus or a bacterium. Preferred protease enzymes include, but are not limited to, the enzymes derived from a *Pseudomonas*, such as *Pseudomonas stutzeri* ATCC 19.154, or from a *Humicola*, such as *Humicola lanuginosa* (typically produced recombinantly in *Aspergillus oryzae*). The lipase can be purified or a component of a microbial extract, and either wild type or variant (either chemical or recombinant).

Proteases

Any protease or mixture of proteases, from any source, can be used in the enzymatic detergent compositions, provided that the selected enzyme is stable in the desired pH range (between about 6 and about 9). For example, the protease enzymes can be derived from a plant, an animal, or a microorganism such as a yeast, a mold, or a bacterium. Preferred protease enzymes include, but are not limited to, the enzymes derived from *Bacillus subtilis, Bacillus licheniformis* and *Streptomyces griseus*. Protease enzymes derived from *B. subtilis* are most preferred. The protease can be purified or a component of a microbial extract, and either wild type or variant (either chemical or recombinant). Exemplary proteases are commercially available under the following trade names Alcalase®, Blaze®, Savinase®, Esperase®, and Progress UNO™ (also sold under the name Evens DUO™) each available from Novozymes.

Other Enzymes

The enzymatic detergent compositions can comprise additional enzymes in addition to the foregoing. Additional suitable enzymes can include, but are not limited to, cutinases, peroxidases, gluconases, or mixtures thereof.

Polyol

The enzymatic detergent compositions comprise a polyol. Preferred polyols include, but are not limited to, C2-C10 polyols, more preferably C3-C8 polyols, most preferably C3-C6 polyols. Preferred polyols include, but are not limited to, erythritol, ethylene glycol, galactitol, glycerine, inositol, mannitol, propylene glycol, sorbitol, and mixtures thereof. We have found that some of the polyols, including, but not limited to propylene glycol can benefit the phase stability of the compositions. Thus, in some embodiments, it is preferable to include multiple polyols—one or more to provide enzyme stability and one or more to provide phase stability for the composition. Most preferred polyols for enzyme stability comprise glycerine, sorbitol, and mixtures thereof. In a most preferred embodiment, the enzymatic detergent compositions comprise a mixture of glycerine, propylene glycol, and sorbitol.

In a preferred embodiment of an enzymatic detergent composition, the polyol is preferably in an amount between about 0.01 wt. % and about 60 wt. %, more preferably between about 1 wt. % and about 50 wt. %, most preferably between about 5 wt. % and about 45 wt. %. In a preferred embodiment of an enzymatic instrument detergent composition, the polyol is preferably in an amount between about 10 wt. % and about 60 wt. %, more preferably between about 12 wt. % and about 50 wt. %, most preferably between about 15 wt. % and about 45 wt. %. In a preferred embodiment of an enzymatic hard surface detergent composition, the polyol is preferably in an amount between about 0.01 wt. % and about 25 wt. %, more preferably between about 0.1 wt. % and about 20 wt. %, most preferably between about 0.5 wt. % and about 20 wt. %.

Additional Ingredients

The enzymatic compositions can comprise a number of additional ingredients. The additional ingredients can be added in an amount sufficient to impart the desired property or functionality. Exemplary additional ingredients, include, but are not limited to, alkalinity sources, aminocarboxylates, corrosion inhibitors, defoamers, dyes, fragrances, phosphonates, preservatives, surfactants, water conditioning agents, and combinations thereof.

Alkalinity Source

The enzymatic compositions can optionally comprise an alkalinity source in addition to the carbonate included in the solidification matrix. Preferred alkalinity sources, include, but are not limited to, alkali metal hydroxides, metal silicates, metal borates, and organic alkalinity sources. If the compositions comprise an optional alkalinity source, it is preferably in an amount between about 0.01 wt. % and about 25 wt. %, more preferably between about 0.1 wt. % and about 20 wt. %, most preferably between about 0.5 wt. % and about 10 wt. %.

Exemplary alkali metal hydroxides that can be used include, but are not limited to sodium, lithium, or potassium hydroxide. Exemplary metal silicates that can be used include, but are not limited to, sodium or potassium silicate or metasilicate. Exemplary metal borates include, but are not limited to, sodium or potassium borate. Organic alkalinity sources are often strong nitrogen bases including, for example, ammonia (ammonium hydroxide), amines, alkanolamines, and amino alcohols. Typical examples of amines include primary, secondary or tertiary amines and diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups. Typical examples of alkanolamines include monoethanolamine, monopropanolamine, diethanolamine, dipropanolamine, triethanolamine, tripropanolamine and the like. Typical examples of amino alcohols include 2-amino-2-methyl-1-propanol, 2-amino-1-butanol, 2-amino-2-methyl-1,3-propanediol, 2-amino-2-ethyl-1,3-propanediol, hydroxymethyl aminomethane, and the like.

Aminocarboxylates

The enzymatic detergent compositions can optionally include an aminocarboxylate (or aminocarboxylic acid materials). In a preferred aspect, the aminocarboxylates include aminocarboxylic acid materials containing little or no NTA. Exemplary aminocarboxylates include, for example, N-hydroxyethylaminodiacetic acid, ethylenediaminetetraacetic acid (EDTA), methylglycinediacetic acid (MGDA), hydroxyethylenediaminetetraacetic acid, diethylenetriaminepentaacetic acid, N-hydroxyethyl-ethylenediaminetriacetic acid (HEDTA), glutamic acid N,N-diacetic acid (GLDA), diethylenetriaminepentaacetic acid (DTPA), Iminodisuccinic acid (IDS), ethylenediamine disuccinic acid (EDDS), 3-hydroxy-2,2-iminodisuccinic acid (HIDS), hydroxyethyliminodiacetic acid (HEIDA) and other similar acids having an amino group with a carboxylic acid substituent. In an aspect, the aminocarboxylate is ethylenediaminetetraacetic acid (EDTA).

If an aminocarboxylate is included in the compositions, it is preferably in an amount between about 0.1 wt. % and about 30 wt. %; more preferably between about 0.5 wt. % and about 25 wt. %, most preferably between about 1 wt. % and 20 wt. %.

Corrosion Inhibitors

The enzymatic detergent compositions can optionally include a corrosion inhibitor. Exemplary corrosion inhibitors include an alkaline metal silicate or hydrate thereof, phosphino succinate, or combination thereof. Exemplary alkali metal silicates include powdered, particulate or granular silicates which are either anhydrous or preferably which contain water of hydration (between about 5 and about 25 wt. %, preferably between about 15 and about 20 wt. % water of hydration). These silicates include sodium silicates and have a $Na_2O:SiO_2$ ratio of about 1:1 to about 1:5, respectively. If a corrosion inhibitor is included in the compositions, it is preferably in an amount between about 0.01 wt. % and about 10 wt. %.

Defoamers

The enzymatic detergent compositions can optionally include a defoamer and/or foam inhibitor. The compositions preferably do not foam or have foam that breaks promptly upon formation. Adding a defoamer and/or foam inhibitor can assist in preventing foam and reducing any foam's stability such that it can break promptly.

Suitable defoamers include silicon compounds such as silica dispersed in polydimethylsiloxane, fatty amides, amides, hydrocarbon waxes, fatty acids and soaps thereof, fatty esters, fatty alcohols, fatty acid soaps, sulfates and sulfonates, ethoxylates, vegetable oils, mineral oils and their sulfonated or sulfated derivatives, polyethylene glycol esters, block copolymers, including for example, difunctional block copolymers and polyoxyethylene-polyoxypropylene block copolymers, alkyl phosphates and phosphate esters such as alkyl and alkaline diphosphates, tributyl phosphates, and monostearyl phosphate, halogenated compounds such as fluorochlorohydrocarbons, and the like. If a defoamer is included in the enzymatic detergent compositions, it is preferably present in an amount sufficient to provide the desired defoaming properties. If a defoamer is included in the compositions, it is preferably in an amount between about 0.01 wt. % and about 10 wt. %, more preferably between about 0.1 wt. % and about 8 wt. %, most preferably between about 0.5 wt. % and about 5 wt. %.

Dyes

The enzymatic detergent compositions can optionally include a dye. Preferred dyes, include, but are not limited to, Violet Dye 148 (Keycolour), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), and Acid Green 25 (Ciba-Geigy).

If a dye is included in the compositions, it is preferably in an amount between about 0.005 wt. % and about 10 wt. %.

Fragrances

The enzymatic detergent compositions can optionally include a fragrance, odorant, or perfume. Preferred fragrances include, but are not limited to, terpenoids such as citronellol, aldehydes such as amyl cinnamaldehyde, a jasmine such as C1S-jasmine or jasmal, vanillin, and the like.

If a fragrance is included in the compositions, it is preferably in an amount between about 0.01 wt. % and about 10 wt. %.

Phosphonates

The enzymatic detergent compositions can optionally include a phosphonate. Examples of phosphonates include, hut are not limited to: phosphinosuccinic acid oligomer (PSO) described in U.S. Pat. Nos. 8,871,699 and 9,255,242, 2-phosphinobutane-1,2,4-tricarboxylic acid (PBTC), 1-hydroxyethane-1,1-diphosphonic acid, $CH_2C(OH)[PO(OH)_2]_2$; aminotri(methylenephosphonic acid), $N[CH_2PO(OH)_2]_3$; aminotri(methylenephosphonate), sodium salt (ATMP), $N[CH_2PO(ONa)_2]_3$; 2-hydroxyethyliminobis(methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$; diethylenetriaininepenta(methylenephosphonate), sodium salt (DTPMP). $C_9H_{(28-x)}NN_3Na_xO_{15}P_5$ (x=7); hexamethylenediamine(tetramethylenephosphonate), potassium salt, $C_{10}H_{(28-x)}N_2O_{12}P_4$ (x=6); bis(hexamethylene)triamine(pentamethylenephosphonic acid), $(HO_2)POCH_2N[(CH_2)_2N[CH_2PO(OH)_2]_2]_2$; monoethanolamine phosphonate (MEAP); diglycolamine phosphonate (DGAP) and phosphorus acid, $H_3PO_3$. Preferred phosphonates are PBTC, HEDP, ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the composition is phosphorous-free.

If a phosphonate is included in the compositions, it is preferably in an amount between about 0.01 wt. % and about 30 wt. %; more preferably between about 0.5 wt. % and about 25 wt. %, most preferably between about 1 wt. % and 10 wt. %.

Preservatives

The enzymatic detergent compositions can optionally include a preservative. Suitable preservatives include, but are not limited to, the antimicrobial classes such as phenolics, quaternary ammonium compounds, metal derivatives, amines, alkanol amines, nitro derivatives, analides, organosulfur and sulfur-nitrogen compounds and miscellaneous compounds. Exemplary phenolic agents include pentachlorophenol, orthophenylphenol. Exemplary quaternary antimicrobial agents include benzalconium chloride, cetylpyridiniumchloride, amine and nitro containing antimicrobial compositions such as hexahydro-1,3,5-tris(2-hydroxyethyl)-s-triazine, dithiocarbamates such as sodium dimethyldithiocarbamate, and a variety of other materials known in the art for their microbial properties. Other exemplary preservatives include gluteraldehyde, Bronopol, silver, and isothiazolones such as methylisothiazolinone. Preferred preservatives include those sold under the tradename Neolone™.

If a preservative is included in the compositions, it is preferably in an amount between about 0.01 wt. % and about 10 wt. %.

Short-Chain Alkylbenzene and/or Alkyl Naphthalene Sulfonates

The enzymatic detergent compositions can optionally comprise a short-chain alkylbenzene sulfonate and/or alkyl naphthalene sulfonate. Preferred a short-chain alkylbenzene sulfonate and/or alkyl naphthalene sulfonate include, but are not limited to, sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, or sodium butylnaphthalene, a mixture thereof.

If a short-chain alkylbenzene sulfonate and/or alkyl naphthalene sulfonate is included in the compositions, it is preferably in an amount between about 0.01 wt. % and about 10 wt. %.

Surfactant

The enzymatic compositions can optionally include one or more surfactants. Preferably, the surfactants are low foaming or non-foaming. Preferred surfactants include, but are not limited to, amphoteric surfactants, nonionic surfactants, and mixtures thereof.

Preferably, the enzymatic detergent compositions comprise surfactant in an amount between about 0.01 wt. % and about 25 wt. %, more preferably between about 0.1 wt. % and about 20 wt. %, and most preferably between about 0.5 wt. % and about 15 wt. %. In a preferred embodiment of an enzymatic instrument detergent composition, the surfactant is in an amount between about 0.1 wt. % and about 25 wt. %, more preferably in an amount between about 0.5 wt. % and about 20 wt. %, most preferably between about 1 wt. % and about 15 wt. %. In a preferred embodiment of an enzymatic hard surface detergent composition, the surfactant is in an amount of between about 0.01 wt. % and about 15 wt. %, more preferably between about 0.1 wt. % and about 12 wt. %, most preferably between about 0.5 wt. % and about 10 wt. %.

Amphoteric Surfactants

The enzymatic compositions can comprise an amphoteric surfactant. Amphoteric surfactants contain both a basic and an acidic hydrophilic group and an organic hydrophobic group. These ionic entities may be any of the anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants are subdivided into two major classes. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes. Preferred amphoteric surfactants for use in the enzymatic compositions can be broadly described as derivatives of aliphatic secondary, tertiary, or quaternary amines, in which the aliphatic radical may be straight chain or branched and wherein one of the aliphatic substituents contains from 6 to 18 carbon atoms and one contains an anionic water solubilizing group, e.g., carboxy, sulfo, sulfato, phosphato, or phosphono. Preferred amphoteric surfactants include amine oxides.

Amine oxides are tertiary amine oxides corresponding to the general formula:

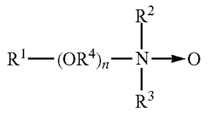

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 18 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Suitable amine oxides can include those selected from the coconut or tallow alkyl di-(lower alkyl) amine oxides, specific examples of which are decyldimethylamine oxide, octyldimethylamine oxide, dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

More preferred are amphoteric surfactants wherein one substituent of the central amine is an aliphatic radical which contains 6 to 11 carbons, or most preferably 8 to 10 carbons, which is either directly attached to the amine or, more preferably, attached to an amidopropyl or alkoxypropyl group which in turn is attached to the amine. Additionally, in the more preferred amphoteric surfactants, one or more substituents of the central amine contain an anionic carboxy group.

Long chain imidazole derivatives having application in the present invention generally have the general formula:

(MONO)ACETATE

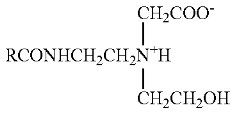

Neutral pH Zwitternion (DI)PROPIONATE

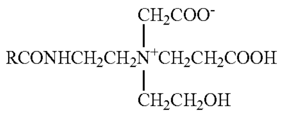

AMPHOTERIC SULFONATE

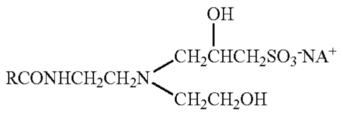

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R{=}C_8\text{-}C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^{30}$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH.

Preferred surfactants include caprylamidopropyl betaine and disodium alkyl hydroxypropyl iminodipropionate. A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Nonionic Surfactants

Nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties.

Suitable nonionic surfactants include the following:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Such compounds can include, by way of example, an EO/PO capped alkoxylated glycerol, wherein the EO groups are between 25 wt. % and 50 wt. % of the surfactant, more preferably between about 30 wt. % and about 50 wt. % of the surfactant. Pluronic® compounds are difunctional (two reactive hydrogens). Tetronic® compounds are tetra-functional block copolymers.
2. Condensation products of one mole of alkyl phenol wherein the alkyl chain, of straight chain or branched chain configuration, or of single or dual alkyl constituent, contains from 8 to 18 carbon atoms with from 3 to 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.
3. Condensation products of one mole of a saturated or unsaturated, straight or branched chain alcohol having from 6 to 24 carbon atoms with from 3 to 50 moles of ethylene oxide. The alcohol moiety can consist of mixtures of alcohols in the above delineated carbon range or it can consist of an alcohol having a specific number of carbon atoms within this range. Examples of like commercial surfactants are available under the trade names Neodol® manufactured by Shell Chemical Co. and Alfonic® manufactured by Vista Chemical Co.

4. Condensation products of one mole of saturated or unsaturated, straight or branched chain carboxylic acid having from 8 to 18 carbon atoms with from 6 to 50 moles of ethylene oxide. The acid moiety can consist of mixtures of acids in the above defined carbon atom range or it can consist of an acid having a specific number of carbon atoms within the range. Examples of commercial compounds of this chemistry are available on the market under the trade names Nopalcol® manufactured by Henkel Corporation and Lipopeg® manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols can be used. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. These reverse Pluronics® are manufactured by BASF Corporation under the trade name Pluronic® R surfactants. Likewise, the Tetronic® R surfactants are produced by BASF Corporation by the sequential addition of ethylene oxide and propylene oxide to ethylenediamine.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

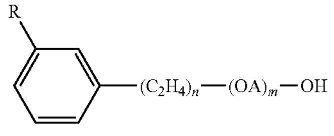

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from 1 to 6 carbon atoms and one reactive hydrogen atom, n has an average value of at least 6.4, as determined by hydroxyl number and m has a value such that the oxyethylene portion constitutes 10% to 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from 2 to 6 carbon atoms and containing x reactive hydrogen atoms in which x has a value of at least 2, n has a value such that the molecular weight of the polyoxypropylene hydrophobic base is at least 900 and m has value such that the oxyethylene content of the molecule is from 10% to 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional useful conjugated polyoxyalkylene surface-active agents correspond to the formula: $P[(C_3H_6O)_n(C_2H_4O)_mH]_x$ wherein P is the residue of an organic compound having from 8 to 18 carbon atoms and containing x reactive hydrogen atoms in which x has a value of 1 or 2, n has a value such that the molecular weight of the polyoxyethylene portion is at least 44 and m has a value such that the oxypropylene content of the molecule is from 10% to 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants include those having the structural formula $R_2CONR_1Z$ in which: $R_1$ is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction, such as a glycityl moiety.

9. The alkyl ethoxylate condensation products of aliphatic alcohols with from 0 to 25 moles of ethylene oxide are suitable. The alkyl chain of the aliphatic alcohol can either be straight or branched, primary or secondary, and generally contains from 6 to 22 carbon atoms.
10. The ethoxylated $C_6$-$C_{18}$ fatty alcohols and $C_6$-$C_{18}$ mixed ethoxylated and propoxylated fatty alcohols are suitable surfactants, particularly those that are water soluble. Suitable ethoxylated fatty alcohols include the $C_{10}$-$C_{18}$ ethoxylated fatty alcohols with a degree of ethoxylation of from 3 to 50.
11. Further exemplary nonionic surfactants suitable for the compositions can include alkyl polyglucosides. Alkyl polyglucosides are a type of alkyl polyglycoside derived from a glucose-based polymer. An alkyl polyglucoside, as used herein in this disclosure, is a molecule having one to ten glucose units backbone and at least one alkyl group attached one of the OH groups and has a generic structure of

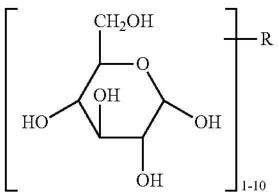

wherein R is an alkyl group and can be attached to any or all of the OH group in the molecule. A cationic alkyl polyglucoside, as used herein in this disclosure, is an alkyl polyglucoside having at least one cationic group in its alkyl group(s).

Preferably, the alkyl group has a carbon chain length between about 1 and about 20 carbons, more preferably between about 2 and about 18 carbons, and most preferably between about 4 and about 16 carbons.

12. Fatty acid amide surfactants include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $—(C_2H_4O)_xH$, where x is in the range of from 1 to 3.
13. Nonionic surfactants also include the class defined as alkoxylated amines or, most particularly, alcohol alkoxylated/aminated/alkoxylated surfactants. These nonionic surfactants may be at least in part represented by the general formulae:

$$R^{20}—(PO)_sN\text{-}(EO)_tH,$$

$$R^{20}—(PO)_sN\text{-}(EO)_tH(EO)_tH, \text{ and}$$

$$R^{20}—N(EO)_tH;$$

in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, and t is 1-10, preferably 2-5. Other variations on the scope of these compounds may be represented by the alternative formula:

$$R^{20}—(PO)_v—N[(EO)_wH][EO)_zH]$$

in which $R^{20}$ is as defined above, v is 1 to 20 (e.g., 1, 2, 3, or 4 (preferably 2)), and w and z are independently 1-10, preferably 2-5.

14. Reverse polyoxyalkylene block copolymer(s) (also known as alkoxylated block copolymer(s)). The reverse polyoxyalkylene block copolymers, especially $\text{-}(EO)_e—(PO)_p$ block copolymers, are effective in preventing or minimizing any normal foaming activity of other components. Because of their better water-solubility characteristics, the reverse polyoxyethylene-polyoxypropylene (i.e., reverse $\text{-}(EO)_e—(PO)_p$) block copolymers are preferred over other reverse polyoxyalkylene block copolymers, such as those that contain polyoxybutylene blocks.

The polyoxyalkylene block copolymers useful in the present compositions can be formed by reacting alkylene oxides with initiators. Preferably, the initiator is multifunctional because of its use results in "multibranch" or "multiarm" block copolymers. For example, propylene glycol (bifunctional), triethanol amine (trifunctional), and ethylenediamine (tetrafunctional) can be used as initiators to initiate polymerization of ethylene oxide and propylene oxide to produce reverse block copolymers with two branches (i.e., arms or linear units of polyoxyalkylenes), three branches, and four branches, respectively. Such initiators may contain carbon, nitrogen, or other atoms to which arms or branches, such as blocks of polyoxyethylene $(EO)_e$, polyoxypropylene $(PO)_p$, polyoxybutylene $(BO)_b$, $\text{-}(EO)_e—(PO)_p$, $\text{-}(EO)_e—(BO)_b$, or $\text{-}(EO)_3—(PO)_p—(BO)_b$, can be attached. Preferably, the reverse block copolymer has arms or chains of polyoxyalkylenes that are attached to the residues of the initiators contain end blocks of $\text{-}(EO)_x—(PO)_y$, which have ends of polyoxypropylene (i.e., $—(PO)_y$), wherein x is about 1 to 1000 and y is about 1 to 500, more preferably x is about 5 to 20 and y is about 5 to 20.

The reverse block copolymer can be a straight chain, such as a three-block copolymer, $$(PO)_y\text{-}(EO)_x—(PO)_y$$

wherein x is about 1 to 1000, preferably about 4 to 230; and y is about 1 to 500, preferably about 8 to 27. Such a copolymer can be prepared by using propylene glycol as an initiator and adding ethylene oxide and propylene oxide. The polyoxyalkylene blocks are added to both ends of the initiator to result in the block copolymer. In such a linear block copolymer, generally the central $(EO)_x$ contains the residue of the initiator and x represents the total number of EO on both sides of the initiator. Generally, the residue of the initiator is not shown in a formula such as the three-block copolymer above because it is insignificant in size and in contribution to the property of the molecule compared to the polyoxyalkylene blocks. Likewise, although the end block of the polyoxyalkylene block copolymer terminates in a —OH group, the end block is represented by $—(PO)_p$, $\text{-}(EO)_x$, $—(PO)_y$, and the like, without specifically showing the —OH at the end. Also, x, y, and z are statistical values representing the average number of monomer units in the blocks.

The reverse polyoxyalkylene block copolymer can have more than three blocks, an example of which is a five-block copolymer, $$(PO)_z\text{-}(EO)_y—(PO)_x\text{-}(EO)_y—(PO)_z$$

wherein x is about 1 to 1,000, preferably about 7 to 21; y is about 1 to 500, preferably about 10 to 20; and z is about 1 to 500, preferably about 5 to 20.

A chain of blocks may have an odd or even number of blocks. Also, in other embodiments, copolymers with more blocks, such as, six, seven, eight, and nine blocks, etc., may be used as long as the end polyoxyalkylene block is either $(PO)_p$ or $(BO)_b$. As previously stated, the reverse $-(EO)_e-(PO)_p$ block copolymer can also have a branched structure having a trifunctional moiety T, which can be the residue of an initiator. The block copolymer is represented by the formula:

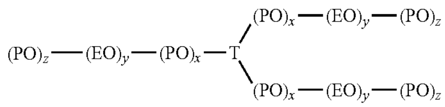

wherein x is about 0 to 500, preferably about 0 to 10; y is about 1 to 500, preferably about 5 to 12, and z is about 1 to 500, preferably about 5 to 10.

Preferred nonionic surfactants include, but are not limited to, reverse Pluronic surfactant having (PO)(EO)(PO) structure and an average molecular weight of less than 3000 g/mole, more preferably less than 2800 g/mole, still more preferably less than 2500 g/mole, wherein the cloud point of a 1% aqueous solution of the surfactant is greater than 30° C., more preferably greater than 35° C., still more preferably greater than 40° C., and most preferably greater than 45° C.

15. Branched Alcohol Alkoxylates

Branched alcohol athoxylate nonionic surfactants are also suitable for the compositions disclosed herein. Preferred branched alcohol alkoxylates include, but are not limited to, Guerbet alcohol alkoxylates having alkoxylation of:

$$PO_a\text{-}EO_b \text{ or } PO_a\text{-}EO_b\text{—}PO_c$$

wherein a is between about 1 and about 10; wherein b is between about 1 and about 14; and wherein c is between about 1 and about 20; and wherein the branched alkyl group has between about 6 and about 20 carbons, more preferably between about 6 and about 18, most preferably between about 8 and about 16.

Water Conditioning Agents

The enzymatic detergent compositions can optionally include a water conditioning agent. Preferably, the water conditioning agent comprises a polycarboxylic acid polymer or salt thereof, a phosphate, and optionally additional polymers. In a preferred embodiment, the compositions are phosphate-free. Suitable polycarboxylic acid polymers include those with a molecular weight less from about 400-50,000 g/mol. Suitable polycarboxylic acid polymers include those with a molecular weight between about 400-50,000 g/mol more preferable between about 400-25,000 g/mol and most preferably between about 400-15,000 g/mol.

Polycarboxylic acid polymers can also be referred to as non-phosphorus containing builders. Polycarboxylic acid polymers may include, but are not limited to those having pendant carboxylate (—CO2-) groups such as acrylic acid homopolymers, maleic acid homopolymers, maleic/olefin copolymers, maleic acid terpolymers, sulfonated copolymers or terpolymers, acrylic/maleic copolymers or terpolymers, methacrylic acid homopolymers, methacrylic acid copolymers or terpolymers, acrylic acid-methacrylic acid copolymers, hydrolyzed polyacrylamides, hydrolyzed polymethacrylamides, hydrolyzed polyamide-methacrylamide copolymers, hydrolyzed polyacrylonitriles, hydrolyzed polymethacrylonitriles, hydrolyzed acrylonitrile-methacrylonitrile copolymers and combinations thereof. Preferred polycarboxylic acids or salts thereof include polyacrylic acid homopolymers, polyacrylic acid copolymers, and maleic acid copolymers and maleic acid terpolymers.

In embodiments of the compositions which are not phosphate-free, added water conditioning agents may include, for example a condensed phosphate, a phosphonate, and the like. Some examples of condensed phosphates include sodium and potassium orthophosphate, sodium and potassium pyrophosphate, sodium tripolyphosphate, sodium hexametaphosphate, and the like.

In embodiments of the compositions which are not phosphate-free, the compositions may include a phosphonate such as 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate), sodium salt

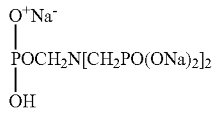

2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene) triamine(pentamethylenephosphonic acid) $(HO_2)POCH_2N[(CH_2)_6N[CH_2PO(OH)_2]_2]_2$; and phosphorus acid $H_3PO_3$. In some embodiments, a phosphonate combination such as ATMP and DTPMP may be used. If a water conditioning agent is included in the compositions, it is preferably in an amount between about 0.1 wt. % and about 30 wt. %; more preferably between about 0.5 wt. % and about 25 wt. %, most preferably between about 1 wt. % and 20 wt. %.

Use Compositions

The compositions as described herein can be prepared as concentrated compositions or as use compositions. The concentrated compositions can be diluted to form a use composition. Preferably, the use compositions are diluted to a concentration between about 500 ppm and about 5000 ppm, more preferably between about 750 ppm and about 4500 ppm, most preferably between about 1000 ppm and about 4000 ppm.

Methods of Use

The enzymatic detergent compositions described herein can be employed in a variety of cleaning methods determined by the particular cleaning application. For example, the enzymatic detergent compositions can be employed in cleaning medical and dental instruments and/or ware.

Methods of Cleaning Medical and Dental Instruments

The enzymatic detergent compositions can be employed in a variety of methods for cleaning, washing, or presoaking medical or dental devices, instruments, or equipment, including any of the various medical or dental instruments or devices that can benefit from cleaning with enzyme cleaning composition. Exemplary medical and dental instruments and devices include instruments, devices, tools, appliances, apparatus, and equipment used in medicine or dentistry including those than can be cold sterilized, soaked or washed and then heat sterilized, or otherwise benefit from cleaning in the disclosed compositions.

The enzymatic detergent compositions can be used to clean medical and/or dental instruments. The medical and/or dental instruments can be soiled with blood, mammalian tissue, including but not limited to human tissue, or other foreign matter. A typical cycle for cleaning medical and dental instruments can have a number of different steps:

pre-wash and/or presoak, wash, rinse, and drying. The pre-wash or presoak step is used to dissolve blood and other soils on the instruments and may be run with a wash solution containing detergent and possibly enzymes. The detergent compositions described herein can be used as a prewash or presoak composition. The wash part of the cycle is run with a cleaning solution; this cleaning solution can be comprised of the diluted detergent compositions described herein. Wash time, water temperature and detergent selection and concentration are typically matched according to requirements for the particular instruments and regulations in the jurisdiction. Rinses are used to remove soil dissolved in the wash stage as well as the remaining detergent. Following the rinse and/or drying step, a disinfecting step can be applied. The disinfecting step can be performed in a number of ways. Typically, a disinfecting step comprises cleaning the instrument with a sanitizer and/or at a temperature greater than about 200° F.

The methods of cleaning medical and dental instruments include diluting the enzymatic detergent composition with water to form a cleaning solution. Preferably, the diluting step is performed at a dilution ratio of between about 1/32 oz/gal and about 1 oz/gal. The cleaning solution preferably has a diluted concentration of about 0.5 wt. % to about 85 wt. %, more preferably between about 1 wt. % and about 50 wt. %, still more preferably between about 1 wt. % and about 30 wt. %, most preferably between about 5 wt. % and about 20 wt. %.

The methods of cleaning medical and dental instruments include contacting an instrument with the cleaning solution. Preferably, the contacting step is performed at a temperature between about 50° F. and about 150° F. In an embodiment, the temperature at the contacting step is between about 50° F. and about 80° F. In an embodiment, the temperature at the contacting step is between about 90° F. and about 145° F. The blood, mammalian tissue, including but not limited to human tissue, and foreign matter can be removed from the instrument during the contacting step. The contacting step can be performed as a prewash or presoak step or as an automatic and/or manual wash step.

The methods of cleaning medical and dental instruments include rinsing the instrument(s) with water. In some embodiments, there is one rinse step. In some embodiments, there are two rinse steps. More rinse steps can be performed if desired. The rinsing can be performed at a temperature between about 50° F. and about 150° F. The blood, mammalian tissue including but not limited to human tissue, and foreign matter can be removed from the instrument during the rinsing step.

Methods of Cleaning Hard Surfaces

The enzymatic detergent compositions can be provided in concentrated form and diluted to a use solution or provided in a use solution. In an embodiment, the enzymatic detergent compositions can be provided in one or more parts. Alternatively, a detergent composition may be provided in two or more parts, such that the overall detergent composition is formed in the stabilized use solution upon combination of two or more compositions. Each of these embodiments are included within the following description of the methods of the invention.

In one embodiment, the detergent compositions may be provided as a concentrate such that the detergent composition employs a small amount of water in order to reduce the expense of transporting the concentrate. The concentrated enzymatic detergent composition can be combined with water for dilution. This can occur prior to use or during a cleaning method where dilution water is introduced during the cleaning process.

In another embodiment, the concentrate detergent composition can be diluted through dispensing equipment to form a use solution. The water flow is delivered at a relatively constant rate using mechanical, electrical, or hydraulic controls and the like. The concentrated enzymatic detergent composition is diluted creating a use solution as the detergent composition and dilution water are combined.

Conventional detergent dispensing equipment can be employed according to the invention. For example, commercially available detergent dispensing equipment which can be used according to the invention are available from Ecolab, Inc. Use of such dispensing equipment results in the erosion of a detergent composition by a water source to form the aqueous use solution according to the invention.

The water used to dilute the concentrate (water of dilution) can be available at the locale or site of dilution. The water of dilution may contain varying levels of hardness depending upon the locale. Service water available from various municipalities have varying levels of hardness. It is desirable to provide a concentrate that can handle the hardness levels found in the service water of various municipalities. The water of dilution that is used to dilute the concentrate can be characterized as hard water when it includes at least 1 grain hardness. It is expected that the water of dilution can include at least 5 grains hardness, at least 10 grains hardness, or at least 20 grains hardness.

The methods according to the invention are directed to cleaning a surface, such as ware in a warewash application, having numerous beneficial results, including stabilizing the composition and in particular the enzymes, providing effective soil removal properties, preventing redeposition of the soils, and maintaining low-foaming of the wash water. Preferably, the methods of cleaning a surface are performed at a temperature between about 60° F. and about 180° F., more preferably between about 80° F. and about 170° F., most preferably between about 100° F. and about 160° F.

In use, a detergent composition is applied to a surface to be washed during a washing step of a wash cycle. A wash cycle may include at least a washing step and a rinsing step and may optionally also include a pre-rinsing step. The wash cycle involves dissolving a detergent composition, which may include according to the invention. During the rinsing step, generally warm or hot water flows over the surfaces to be washed. The rinse water may include components such as, for example, surfactants or rinse aids. The enzymatic detergent composition is intended for use only during the washing step of the wash cycle and is not used during the rinsing step. Preferably, the wash cycle is performed at a temperature between about 60° F. and about 180° F., more preferably between about 80° F. and about 170° F., most preferably between about 100° F. and about 160° F.

Methods of Making the Enzymatic Detergent Compositions

The enzymatic detergent compositions can be prepared by combining and mixing the various ingredients. Preferably, the enzyme is added last to prevent denaturation or inactivation of the enzyme. Mixing can be performed by any suitable automatic or manual method. For example, automatic or manual stirring can be performed. The enzymatic detergent compositions can be prepared in batch or continuous process. If preparing a concentrated composition the concentrated composition can be prepared to achieve a desired concentration level, including, but not limited to a 10:1 dilution ratio, 8:1 dilution ratio, a 6:1 dilution ratio, a 4:1 dilution ratio, a 2:1 dilution ratio, where the dilution ratio represents the quantity of diluent (such as water) to a single part of the enzymatic detergent composition. The concentrated enzymatic detergent compositions can also be prepared to achieve a desired viscosity for optimal dispensing, pouring, and/or pumping. Preferably, the concentrated enzymatic detergent compositions have a viscosity of between about 1 cps and about 3000 cps, more preferably between about 5 cps and about 2500 cps, and most preferably between about 10 cps and about 2000 cps. Use compositions can be prepared by including additional water to achieve the desired concentration of active ingredients, or a concentrated composition can be diluted with a diluent (such as water) to achieve the desired concentration of active ingredients.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only and are non-limiting. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Materials Used:

Acusol 445N—An exemplary polyacrylic acid homopolymer at about 45% active;

Neolone M10—an exemplary isothiazolinone preservative;

Pluronic 25R2—an exemplary block copolymer;

Commercially available exemplary C8-C13 alkoxylated Guerbet alcohol, citric acid, enzymes (protease, amylase, lipase), glycerin, propylene glycol, sodium hydroxide, triethanolamine (TEA).

Example 1

Enzyme stability of various exemplary liquid detergent formulations containing at least one enzyme were evaluated. Stability results for each of the enzymes tested (protease, amylase, and lipase) were collected. The formulations were stored at various temperatures including room temperature (RT), 40° C., and 50° C., over a period of 8 weeks. Samples of each of the tested formulations were collected at 2 weeks, 4 weeks, and 8 weeks. Assays of enzyme activity in the tested formulations (% retained activity) were conducted, with enzyme activity serving as an indicator of the stability of the enzyme within the liquid formulations. For the use of such an assay, t=0 min was the reference point for 100% enzyme activity. The enzyme stability results of various liquid formulations are presented in the examples herein.

The analysis by protease assay was conducted as follows. For the assays, a detergent composition was used to generate an aqueous use solution evaluated herein. Enzyme activity was traced quantitatively using a standard protease assay. Samples were prepared under bench top conditions, whereby the use solution from a detergent composition or detergent were stored at various temperatures, including at room temperature (RT), 40° C., and 50° C. Samples of each of the tested formulations were collected at 2 weeks, 4 weeks, and 8 weeks. After the time course for assessing enzyme stability is initiated, aliquots were taken at various time points and flash-frozen. A time=0 sample was prepared for each series by dissolving the detergent formulation, mixing thoroughly, and flash freezing. Samples were thawed and diluted as necessary in an assay buffer usually for use in the protease assay. A glycine buffer (0.3 M) at pH 9.0 is used here. The assay monitored the direct reaction of the protease on a small, commercially available peptidyl substrate, with liberation of the product providing correlation to the active enzyme content. The product was detected using a plate reader with an appreciable dynamic range (upper absorbance limit of the instrument >3.5). Average absorbance readings for each sample were collected and used to create a calibration curve of standard activity vs. absorbance. Using the calibration curve, the enzyme activity was calculated.

The analysis by lipase and amylase assay was conducted similarly, except with a different substrate and buffers. For lipase activity, the substrate is p-nitrophenyl valerate, and for amylase, the substrate is an ethylidene substrate (EPS). The buffer used in lipase assay is TRIS (Tris(hydroxymethyl)aminomethane) buffer (0.2 M) at pH 8.0, and in amylase assay HEPES (4-(2-hydroxyethyl)-1-piperazineethanesulfonic acid) buffer (0.5 M) at pH 8.0.

The components of the tested detergent compositions are listed in Table 2. All formulations included protease, lipase, and amylase. Two different proteases were evaluated, with Formula 1A and Formula 1B incorporating one protease, and Formula 2A and Formula 2B incorporating a different protease. Further, Formula 1B and Formula 2B both included buffers comprising citric acid and TEA. All formulations had a 1:1 ratio of glycerin:propylene glycol. The amounts of each component within the formulations are shown in weight percent.

TABLE 2

| Component | Formula 1A (wt-%) | Formula 1B (wt-%) | Formula 2A (wt-%) | Formula 2B (wt-%) |
|---|---|---|---|---|
| Water | 42.45 | 42.1 | 42.45 | 42.1 |
| Glycerin | 23 | 19.38 | 23 | 19.38 |
| Propylene Glycol | 23 | 19.37 | 23 | 19.37 |
| Water Conditioning Agent | 5 | 5 | 5 | 5 |
| Triethanolamine | | 7.1 | | 7.1 |
| Citric acid, 50% | | 0.9 | | 0.4 |
| NaOH, 50% | 0.4 | | 0.4 | |
| $C_8$-$C_{12}$ Branched Alcohol Alkoxylate having 4-14 moles Alkoxylation | 2.5 | 2.5 | 2.5 | 2.5 |
| EO/PO Block Copolymer | 0.5 | 0.5 | 0.5 | 0.5 |
| Preservative | 0.15 | 0.15 | 0.15 | 0.15 |
| Protease | 2 | 2 | 2 | 2 |
| Lipase | 0.5 | 0.5 | 0.5 | 0.5 |
| Amylase | 0.5 | 0.5 | 0.5 | 0.5 |
| TOTAL | 100 | 100 | 100 | 100 |

The percent retained activity of protease in each of Formula 1A, Formula 1B, Formula 2A, and Formula 2B are shown below in Table 3.

TABLE 3

| Protease Results | | | | |
|---|---|---|---|---|
| Storage | Percent (%) Retained Activity | | | |
| Condition | Formula 1A | Formula 1B | Formula 2A | Formula 2B |
| RT, t = 0 | 100 | 100 | 100 | 100 |
| RT, 2 wk | 83 | 97 | 5 | 100 |
| RT, 4 wk | 70 | 100 | 0 | 100 |
| RT, 8 wk | 40 | 100 | 0 | 99 |
| 40° C., 2 wk | 2 | 100 | 0 | 100 |
| 40° C., 4 wk | 0 | 100 | 0 | 94 |
| 40° C., 8 wk | 0 | 100 | 0 | 81 |
| 50° C., 2 wk | 0 | 98 | 0 | 11 |
| 50° C., 4 wk | 0 | 100 | 0 | 0 |
| 50° C., 8 wk | 0 | 100 | 0 | 0 |

The percent retained activity of amylase in each of Formula 2A and Formula 2B are shown below in Table 4.

TABLE 4

| Amylase Results | | |
|---|---|---|
| | Percent (%) Retained Activity | |
| Storage Condition | Formula 2A | Formula 2B |
| RT, t = 0 | 100 | 100 |
| RT, 2 wk | 0 | 100 |
| RT, 4 wk | 0 | 100 |
| RT, 8 wk | 0 | 100 |
| 40° C., 2 wk | 0 | 100 |
| 40° C., 4 wk | 0 | 100 |
| 40° C., 8 wk | 0 | 100 |
| 50° C., 2 wk | 0 | 100 |
| 50° C., 4 wk | 0 | 100 |
| 50° C., 8 wk | 0 | 100 |

The percent retained activity of lipase in each of Formula 2A and Formula 2B are shown below in Table 5.

TABLE 5

| Lipase Results | | |
|---|---|---|
| | Percent (%) Retained Activity | |
| Storage condition | Formula 2A | Formula 2B |
| RT, t = 0 | 137 | 100 |
| RT, 2 wk | 23 | 100 |
| RT, 4 wk | 0 | 95 |
| RT, 8 wk | 0 | 100 |
| 40° C., 2 wk | 0 | 100 |
| 40° C., 4 wk | 0 | 98 |
| 40° C., 8 wk | 0 | 96 |
| 50° C., 2 wk | 0 | 73 |
| 50° C., 4 wk | 0 | 43 |
| 50° C., 8 wk | 0 | 8 |

The results demonstrate that the inclusion of both citric acid and TEA within the detergent compositions provided a dramatic improvement in enzyme stability. As shown in Table 5, both Formula 1B and Formula 2B, which included citric acid and TEA, provided increased percent enzyme retained activity in comparison to Formula 1A and Formula 2A. The increase in enzyme stability was especially observed as the temperature increased from room temperature to 50° C., demonstrating the surprising increased enzyme stability in detergent compositions with the addition of buffering agents. Without being limited to a particular theory of the invention, the results suggest that citric acid and TEA synergistically function as a dual-purpose enzyme stabilizer and buffer.

The same trend can be seen with the amylase and lipase results, where Formula 2B provided significant improvements in percent enzyme retained activity in comparison to Formula 1B.

Example 2

Enzyme stability was further evaluated with respect to evaluating different solvent combinations of the detergent compositions. Exemplary detergent compositions were tested to determine the effect of increasing the glycerin: water ratio within the compositions on enzyme stability. Each of the formulations were formulated to have increasing amounts of glycerin, while having decreasing amounts of water. The formulations are shown below in Table 6. All formulations include citric acid and TEA as buffers.

TABLE 6

| Component | Formula G10 (wt-%) | Formula G20 (wt-%) | Formula G40 (wt-%) | Formula G60 (wt-%) |
|---|---|---|---|---|
| Water | 73.85 | 63.85 | 43.85 | 23.85 |
| Glycerin | 10 | 20 | 40 | 60 |
| Water Conditioning agent | 5 | 5 | 5 | 5 |
| Triethanolamine | 7.1 | 7.1 | 7.1 | 7.1 |
| Citric acid (50%) | 0.9 | 0.9 | 0.9 | 0.9 |
| Preservative | 0.15 | 0.15 | 0.15 | 0.15 |
| Protease | 2 | 2 | 2 | 2 |
| Lipase | 0.5 | 0.5 | 0.5 | 0.5 |
| Amylase | 0.5 | 0.5 | 0.5 | 0.5 |
| TOTAL | 100 | 100 | 100 | 100 |

The percent retained activity of protease in each of Formula G10, Formula G20, Formula G40, and Formula G60 are shown below in Table 7.

TABLE 7

| Protease Results | | | | |
|---|---|---|---|---|
| | Percent (%) Retained Activity | | | |
| Storage Condition | Formula G10 | Formula G20 | Formula G40 | Formula G60 |
| RT, t = 0 | 100 | 100 | 100 | 100 |
| RT, 2 wk | 100 | 100 | 100 | 87 |
| RT, 4 wk | 98 | 100 | 100 | 87 |
| RT, 8 wk | 86 | 95 | 93 | 78 |
| 40° C., 2 wk | 82 | 93 | 91 | 87 |
| 40° C., 4 wk | 74 | 86 | 97 | 90 |
| 40° C., 8 wk | 51 | 66 | 77 | 74 |
| 50° C., 2 wk | 2 | 30 | 72 | 79 |
| 50° C., 4 wk | 0 | 0 | 48 | 64 |
| 50° C., 8 wk | 0 | 0 | 12 | 38 |

The percent retained activity of amylase in each of Formula G10, Formula G20, Formula G40, and Formula G60 are shown below in Table 8.

TABLE 8

| Amylase Results | | | | |
|---|---|---|---|---|
| | Percent (%) Retained Activity | | | |
| Storage Condition | Formula G10 | Formula G20 | Formula G40 | Formula G60 |
| RT, t = 0 | 100 | 100 | 100 | 100 |
| RT, 2 wk | 100 | 100 | 100 | 100 |
| RT, 4 wk | 100 | 100 | 100 | 100 |
| RT, 8 wk | 100 | 100 | 100 | 100 |
| 40° C., 2 wk | 100 | 100 | 100 | 100 |
| 40° C., 4 wk | 100 | 100 | 100 | 100 |
| 40° C., 8 wk | 100 | 100 | 100 | 100 |
| 50° C., 2 wk | 100 | 100 | 100 | 100 |
| 50° C., 4 wk | 100 | 100 | 100 | 100 |
| 50° C., 8 wk | 76 | 94 | 100 | 100 |

The percent retained activity of lipase in each of Formula G10, Formula G20, Formula G40, and Formula G60 are shown below in Table 9.

TABLE 9

| Lipase Results | | | | |
|---|---|---|---|---|
| | Percent (%) Retained Activity | | | |
| Storage Condition | Formula G10 | Formula G20 | Formula G40 | Formula G60 |
| RT, t = 0 | 100 | 100 | 100 | 100 |
| RT, 2 wk | 99 | 100 | 92 | 94 |
| RT, 4 wk | 96 | 100 | 94 | 100 |
| RT, 8 wk | 100 | 100 | 100 | 100 |
| 40° C., 2 wk | 96 | 100 | 100 | 93 |
| 40° C., 4 wk | 100 | 100 | 100 | 100 |
| 40° C., 8 wk | 100 | 100 | 100 | 100 |
| 50° C., 2 wk | 91 | 98 | 99 | 91 |
| 50° C., 4 wk | 87 | 100 | 95 | 80 |
| 50° C., 8 wk | 56 | 59 | 56 | 48 |

As shown in the results, all formulations demonstrated effective percent retained activity for both amylase and lipase, where minimal reduction of enzyme activity across all temperature ranges and length of storage time were observed. However, it was surprisingly found that protease stability was significantly improved at high temperatures (50° C.) as the ratio of glycerin:water increased. These results demonstrate that the concentration of glycerin to water highly affect protease stability at high temperatures, where higher glycerin:water ratios provided improved protease stability.

Example 3

Additional enzyme stability testing of exemplary detergent compositions was conducted on compositions having varying buffers and solvents. All formulations included protease, lipase, and amylase. Two different exemplary commercially available proteases were again evaluated, with Formula 3A and Formula 4A incorporating one protease, and Formula 3B, Formula 4B, and Formula 5 incorporating a different protease. The tested formulations are provided below in Table 10.

TABLE 10

| Component | Formula 3A (wt-%) | Formula 3B (wt-%) | Formula 4A (wt-%) | Formula 4B (wt-%) | Formula 5 (wt-%) |
|---|---|---|---|---|---|
| Water | 42.1 | 42.1 | 42.6 | 42.6 | 42.1 |
| Propylene Glycol | 38.75 | 38.75 | 38.75 | 38.75 | |
| Glycerin | | | | | 38.75 |
| Water Conditioning Agent | 5 | 5 | 5 | 5 | 5 |
| Citric acid, 50% | 0.9 | 0.9 | | | 0.9 |
| Triethanol-amine | 7.1 | 7.1 | 6.25 | 6.25 | 7.1 |
| Mono-ethanolamine | | | 1.25 | 1.25 | |
| $C_8$-$C_{13}$ Branched Alcohol Alkoxylate | 2.5 | 2.5 | 2.5 | 2.5 | 2.5 |
| EO/PO Block Copolymer | 0.5 | 0.5 | 0.5 | 0.5 | 0.5 |
| Preservative | 0.15 | 0.15 | 0.15 | 0.15 | 0.15 |
| Protease | 2 | 2 | 2 | 2 | 2 |
| Lipase | 0.5 | 0.5 | 0.5 | 0.5 | 0.5 |
| Amylase | 0.5 | 0.5 | 0.5 | 0.5 | 0.5 |
| TOTAL | 100 | 100 | 100 | 100 | 100 |

The percent retained activity of protease in each of Formula 3A, Formula 3B, Formula 4A, Formula 4B, and Formula 5 are shown below in Table 11.

TABLE 11

| Protease Results | | | | | |
|---|---|---|---|---|---|
| | Percent (%) Retained Activity | | | | |
| Storage Condition | Formula 3A | Formula 3B | Formula 4A | Formula 4B | Formula 5 |
| RT, t = 0 | 80 | 97 | 85 | 95 | 88 |
| RT, 2 wk | 87 | 100 | 89 | 100 | 100 |
| RT, 4 wk | 75 | 100 | 85 | 100 | 100 |
| RT, 8 wk | 78 | 100 | 82 | 99 | 100 |
| 40° C., 2 wk | 88 | 89 | 89 | 80 | 100 |
| 40° C., 4 wk | 80 | 75 | 84 | 60 | 100 |
| 40° C., 8 wk | 84 | 57 | 86 | 37 | 90 |
| 50° C., 2 wk | 72 | 0 | 75 | 0 | 70 |
| 50° C., 4 wk | 66 | 0 | 70 | 0 | 50 |
| 50° C., 8 wk | 61 | 0 | 56 | 0 | 19 |

Comparing the results from Table 11 with those provided in Table 3, there is a notable difference in stability. In particular, the Formulation 1B (Table 3) provides improved stability versus the comparative formulations in Table 11, particularly under the 50° C. storage conditions. For example, Formula 3A (Table 11) saw a pronounced reduction in retained protease activity at 50° C. dropping to 72% (at two weeks), 66% (at four weeks), and 61% (at eight weeks). In contrast, Formula 1B showed about 100% retained protease activity at two weeks, four weeks, and eight weeks at 50° C. This demonstrates that the addition of glycerin provided improved enzymatic stability over just propylene glycol on its own.

The percent retained activity of amylase in each of Formula 3B, Formula 4B, and Formula 5 are shown below in Table 12.

TABLE 12

| Amylase Results | | | |
|---|---|---|---|
| Storage | Percent (%) Retained Activity | | |
| Condition | Formula 3B | Formula 4B | Formula 5 |
| RT, t = 0 | 100 | 100 | 100 |
| RT, 2 wk | 100 | 100 | 100 |
| RT, 4 wk | 100 | 100 | 100 |
| RT, 8 wk | 100 | 100 | 100 |
| 40° C., 2 wk | 100 | 100 | 100 |
| 40° C., 4 wk | 100 | 100 | 100 |
| 40° C., 8 wk | 100 | 100 | 100 |
| 50° C., 2 wk | 100 | 100 | 100 |
| 50° C., 4 wk | 98 | 92 | 100 |
| 50° C., 8 wk | 100 | 100 | 100 |

The percent retained activity of lipase in each of Formula 3B, Formula 4B, and Formula 5 are shown below in Table 13.

TABLE 13

| Lipase Results | | | |
|---|---|---|---|
| Storage | Percent (%) Retained Activity | | |
| Condition | Formula 3B | Formula 4B | Formula 5 |
| RT, t = 0 | 100 | 100 | 100 |
| RT, 2 wk | 57 | 100 | 100 |
| RT, 4 wk | 100 | 95 | 100 |
| RT, 8 wk | 100 | 100 | 100 |
| 40° C., 2 wk | 95 | 95 | 100 |
| 40° C., 4 wk | 63 | 43 | 100 |
| 40° C., 8 wk | 47 | 38 | 55 |
| 50° C., 2 wk | 0 | 2 | 98 |
| 50° C., 4 wk | 0 | 0 | * |
| 50° C., 8 wk | 0 | 0 | 25 |

* data not collected at week four for Formula 5.

The results demonstrate that the use of propylene glycol instead of glycerin provide comparable enzyme stability with compositions that utilize glycerin. However, at high temperatures, such as at 50° C., glycerin appears to have higher efficacy in stabilizing protease enzymes. This is especially true with the inclusion of citric acid and TEA as buffers, as shown in Formula 5, which provided effective enzyme stability throughout all temperature ranges and length of storage time.

Example 4

The foaming properties of various exemplary low-foaming detergent compositions containing enzymes were further evaluated against currently available commercial detergent products. Exemplary detergent formulas were formulated according to Table 14.

The testing methodology to measure foam height utilized the Glewwe foam test machine. Three liters of water were added to the machine, and the recirculating pump was adjusted to a pressure of 2 psi, which impinged on the detergent solution reservoir with a force comparable to that of water from a faucet or detergent solution from a dispensing hose impinging on a sinkful of detergent solution. The water temperature was initially adjusted to 20° C., and a dose of 4000 ppm of detergent was added to the solution in the machine. The solution was recirculated for 30-120 seconds, after which the pump was shut off to allow all of the foam in the machine to break. The recirculating pump was then restarted at 2 psi for 60 seconds, shut off, and foam height was measured at 0, 15, and 60 seconds after pump shutoff. The pump was turned back on, the test solution was heated to 40° C., and then then the pump was shut off to allow all of the foam in the machine to break. Finally, the pump was run again at 2 psi for 60 seconds, shut off, and the foam height was measured at 0, 15, and 60 seconds. The results from the Glewwe Foam Test can be found in Table 15.

TABLE 14

| | Exemplary Formulas (wt-%) | | |
|---|---|---|---|
| Component | Formula 1 | Formula 2 | Formula 3 |
| Water | 42.1 | 42.1 | 42.1 |
| Glycerin | 19.38 | 19.38 | 19.38 |
| Propylene Glycol | 19.37 | 19.37 | 19.37 |
| Water Conditioning Agent | 5 | 5 | 5 |
| TEA | 7.1 | 7.1 | 7.1 |
| Citric acid, 50% | 0.9 | 0.9 | 0.9 |
| $C_8$-$C_{13}$ Branched Alcohol Alkoxylate | 3.0 | 2.5 | 2.5 |
| EO/PO Block Copolymer Defoaming Agent | | 0.5 | |
| Alkoxylated Alcohol Defoaming Agent | | | 0.5 |
| Preservative | 0.15 | 0.15 | 0.15 |
| Protease | 2 | 2 | 2 |
| Lipase | 0.5 | 0.5 | 0.5 |
| Amylase | 0.5 | 0.5 | 0.5 |

TABLE 15

| Glewwe Testing Results (0 gpg water, 2 psi jet, 1 min agitation) | | | | | | |
|---|---|---|---|---|---|---|
| | Foam Height (in), 20° C. | | | Foam Height (in), 40° C. | | |
| Detergent (4000 ppm) | 0 sec | 15 sec | 60 sec | 0 sec | 15 sec | 60 sec |
| Exemplary Formula 1 | 5/4 | 1/4 | 1/8 | 7/4 | 1/2 | 3/16 |
| Exemplary Formula 2 | 5/8 | 3/16 | 1/8 | 11/16 | 7/16 | 3/16 |
| Exemplary Formula 3 | 9/16 | 1/16 | 1/16 | 3/8 | 1/8 | 1/16 |
| Ruhof Endozime AW Triple Plus with A.P.A. | 1 1/4 | 1/4 | 1/16 | 7/8 | 3/16 | 1/32 |
| Prolystica 2X | 6 | 5 1/2 | 4 | 7 1/2 | 7 | 6 1/2 |

As shown in Table 15, the exemplary formulas demonstrated comparable or superior low-foaming properties in comparison to current commercial enzymatic detergent products. The low-foam height of the exemplary formulations can be observed at both 20° C. and 40° C. Not only were the exemplary formulations initially low-foaming in comparison to other commercial products, the foam height broke down quickly, with a decrease in foam observed within 15 seconds.

Example 5

The exemplary detergent formulations from Example 4 were further evaluated for oil-water interfacial tension in comparison to the commercially available detergent products from Example 4. The evaluated formulations included Exemplary Formula 2, Ruhof Endozime AW Triple Plus with A.P.A., Prolystica 2X, and water as a control.

A spinning drop tensiometer was used to measure oil-water interfacial tension for the evaluated detergent compositions. Each test product was prepared at 40° C. and maintained at 40° C. throughout the experiment using a recirculating water bath attached to the spinning drop tensiometer. Each sample tube was flushed with a test solution, then filled with that test solution, capped, and placed into the spinning drop tensiometer. A droplet of corn oil approximately 5-15 μL in volume was injected through the endcap into the tube. The tube was then spun up promptly after injection to a constant speed between 2000 and 8000 RPM. The speed was selected to give each droplet an initial length-to-width ratio of 2-4, and varied with the droplet volume and the oil-water interfacial tension produced by the test solution. A camera was centered on the droplet, and software was used to calculate and record oil-water interfacial tension based on the drop shape. The oil-water interfacial tension of the droplet was tracked for at least 20 minutes.

Oil-water interfacial tension data for Exemplary Formula 2, Ruhof Endozime AW Triple Enzymatic with A.P.A., Prolystica 2X, and water as a control are shown in FIG. 1 at 1000 ppm and 4000 ppm detergent. At both 1000 and 4000 ppm detergent, Exemplary Formula 2 lowers oil-water interfacial tension nearly as much as Prolystica 2X, a leading commercial detergent composition. Although Exemplary Formula 2 was not able to lower the interfacial tension as low as Prolystica 2X, Exemplary Formula 2 was the only composition to have low-foaming properties in addition to effective lowering of interfacial tension. Although Exemplary Formula 2 and Ruhof Endozime AW Triple Enzymatic with A.P.A. produce comparable foam heights, as shown in Example 3, FIG. 1 demonstrates that Exemplary Formula 2 was able to lower interfacial tension further than Ruhof Endozime AW Triple Enzymatic with A.P.A. These results demonstrate the beneficial and superior properties of exemplary compositions of the present application in providing superior low and fast breaking foam with detergent properties for cleaning.

Example 6

The exemplary detergent formulations from Example 4 were further evaluated for removal of simulated surgical soil in comparison to the commercially available detergent products from Example 4. The evaluated formulations included Exemplary Formula 2, Ruhof Endozime AW Triple Plus with A.P.A., Prolystica 2X, and water as a control.

1000 mL water was heated to 40° C. in a 1000 mL beaker approximately 4" in diameter, and 2000 or 4000 ppm detergent was added to make a detergent solution. The beakers were placed in a 40° C. water bath and continuously stirred with a 2 inch stir bar at about 300 RPM.

TOSI coupons from Healthmark, which are stainless steel coupons with simulated dried blood soil and fibrin on them, were removed from their packaging and plastic casing, and one TOSI coupon was placed directly into each RTU solution to soak for 30 min. The TOSI coupons were placed facing the 1 inch wide vortex, approximately ½" from the center of the vortex, with the top (i.e., short side) of each coupon just under the surface of the water. Pictures of soil removal were taken at 5, 10, 15, 20, 25, and 30 min after each TOSI coupon was immersed in the solution.

Figure 2:
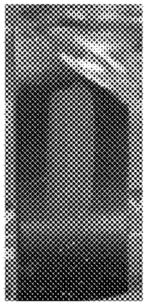
FIG. 2 shows pictures of simulated surgical soil being cleaned off of stainless steel TOSI coupons, in order to compare the cleaning effectiveness of various commercial enzymatic detergent compositions with that of an exemplary detergent composition of the present invention.
Figure 2:
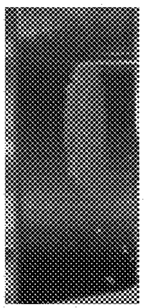
Figure 2:
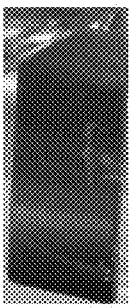
Figure 2:
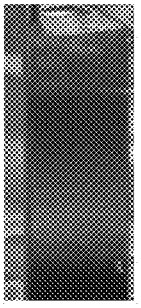
Figure 2:
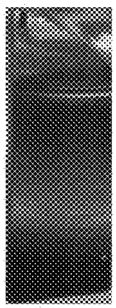
Figure 2:
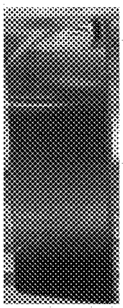
Figure 2:
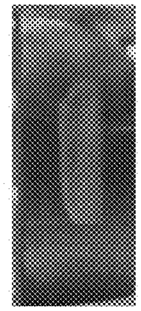
Figure 2:
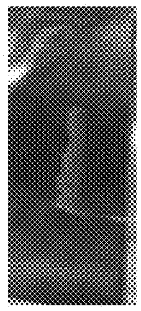
Figure 2:
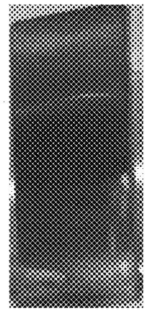
Figure 2:
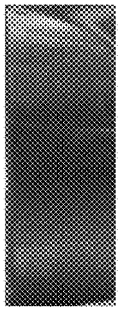
Figure 2:
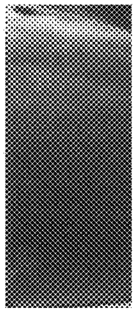
Figure 2:
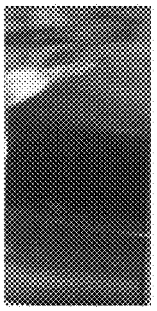
Figure 2:
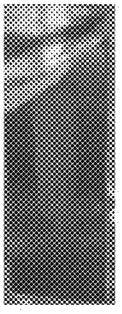
Figure 2:
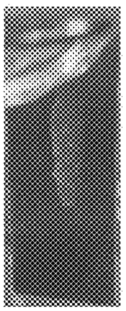
Figure 2:
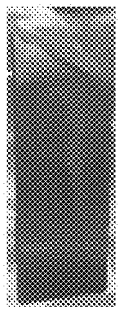
Figure 2:
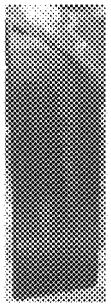
Figure 2:
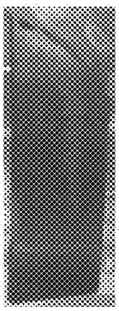
Figure 2:
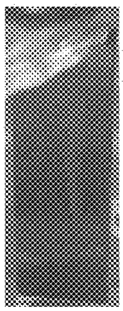
Figure 2:
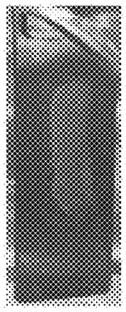
Figure 2:
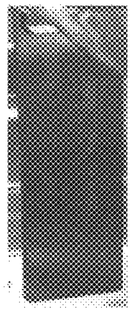
Figure 2:
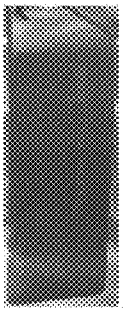
Figure 2:
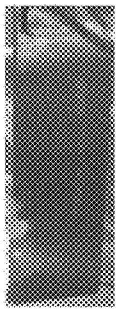
Figure 2:
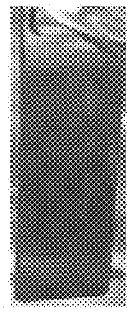
Figure 2:
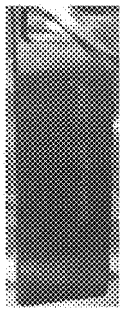

As shown in FIG. 2, Exemplary Formula 2 effectively cleans the simulated surgical soil off of the stainless steel coupon in 15-20 min, depending on the detergent concentration. In contrast, Prolystica 2X leaves substantial residue on the stainless steel coupons even after they have soaked in the cleaning solution for 30 min. These results demonstrate the beneficial and superior properties of exemplary compositions of the present application in removing simulated surgical soil from hard surfaces such as stainless steel.

Example 7

Figure 3A:
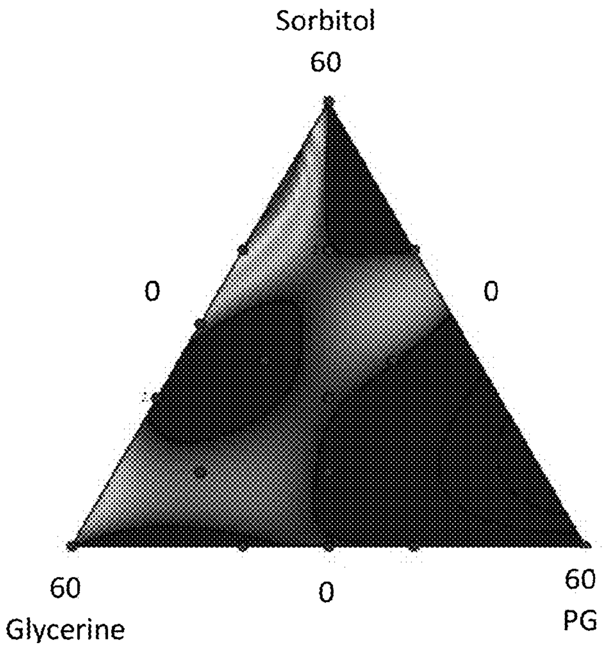
FIG. 3A shows a color ternary plot of the retained activity of nineteen exemplary protease enzyme compositions stored at 50° C. for 8 weeks, comparing the stability of the enzyme with three different polyols: sorbitol, glycerine, and propylene glycol, each with a sodium carbonate and citric acid buffer system.
Figure 3B:
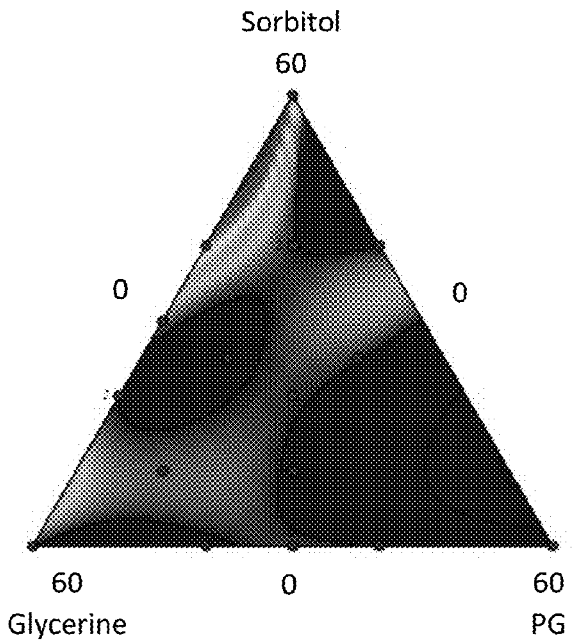
FIG. 3B shows a color ternary plot of the retained activity of nineteen exemplary lipase enzyme stored at 50° C. for 8 weeks, comparing the stability of the enzyme with three different polyols: sorbitol, glycerine, and propylene glycol, each with a sodium carbonate and citric acid buffer system.
Figure 3C:
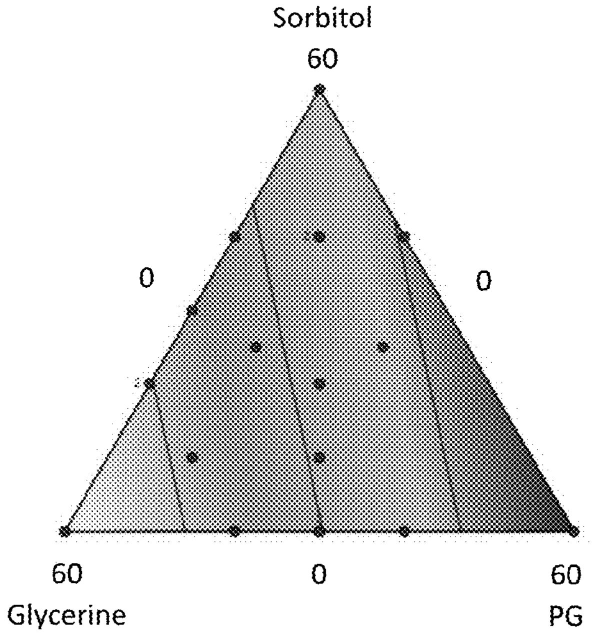
FIG. 3C shows a color ternary plot of the retained activity of nineteen exemplary amylase enzyme stored at 50° C. for 8 weeks, comparing the stability of the enzyme with three different polyols: sorbitol, glycerine, and propylene glycol, each with a sodium carbonate and citric acid buffer system.

The effect of different polyols and their concentrations on enzyme stability was evaluated in a sodium carbonate and citric acid buffer system. The polyols tested were sorbitol, glycerine, and propylene glycol. Nineteen enzyme compositions were prepared varying the concentration of the polyols in the concentration from between 0 wt. % and 60 wt. %; these concentrations are reflected by red dots in the ternary plots shown as FIGS. 3A-3C. The amount of enzyme and components in the buffer system were kept constant. Stability results for each of the enzymes tested (protease, amylase, and lipase) were collected. The formulations were stored at and 50° C. over a period of 8 weeks. Samples of each of the tested formulations were collected after 8 weeks. Assays were performed as described in Example 1. Three different enzymes were tested, a protease, a lipase, and an amylase. The compositions were stored at 50° C. for 8 weeks. The results of this testing are shown in FIGS. 3A (protease), 3B (lipase), and 3C (amylase). As can be seen in the figures, the enzymes exhibited the most stability with sorbitol, glycerine, or mixtures of sorbitol and glycerine; while propylene glycol provided some enzyme stability, it did not contribute as significantly as the other two polyols. The red areas show the highest retained activity with orange to green representing very good retained enzyme activity. The blue areas still provide improved retention of enzyme activity, but not has high as the green, orange and red sections. These results demonstrate that of the three poyols tested, sorbitol, glycerine, and mixtures of the two provide the highest retention of enzyme activity.

Example 8

Figure 4A:
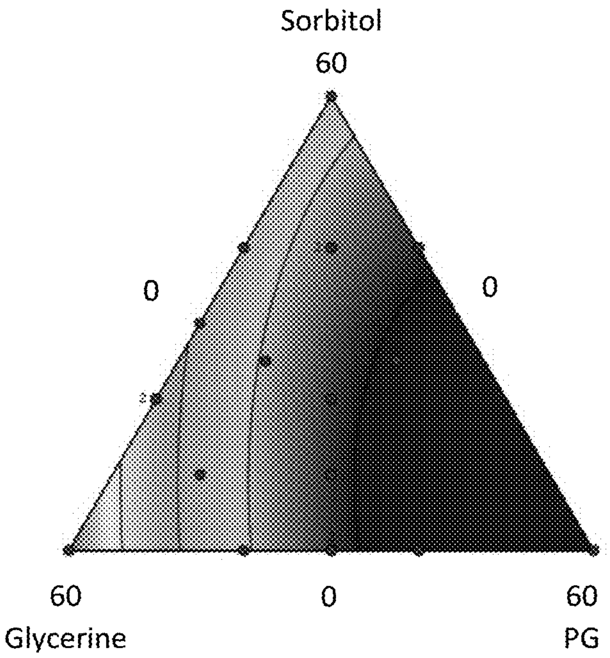
FIG. 4A shows a color ternary plot of the retained activity of nineteen exemplary protease enzyme stored at 50° C. for 8 weeks, comparing the stability of the enzyme with three different polyols: sorbitol, glycerine, and propylene glycol, each with a TEA and citric acid buffer system.
Figure 4B:
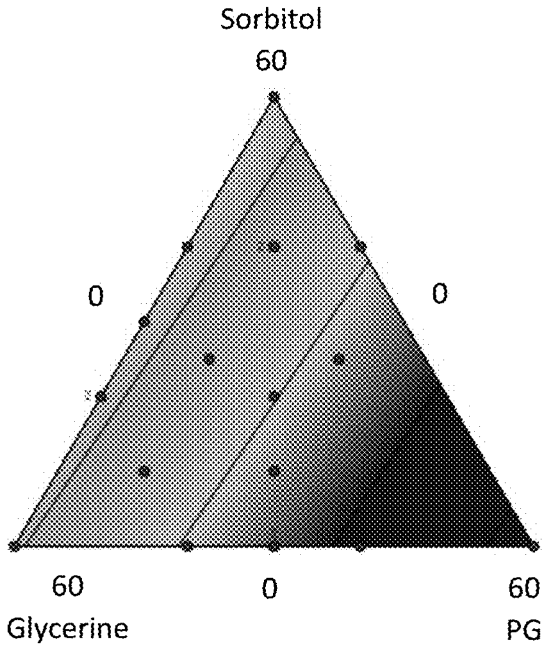
FIG. 4B shows a color ternary plot of the retained activity of nineteen exemplary lipase enzyme stored at 50° C. for 8 weeks, comparing the stability of the enzyme with three different polyols: sorbitol, glycerine, and propylene glycol, each with a TEA and citric acid buffer system.
Figure 4C:
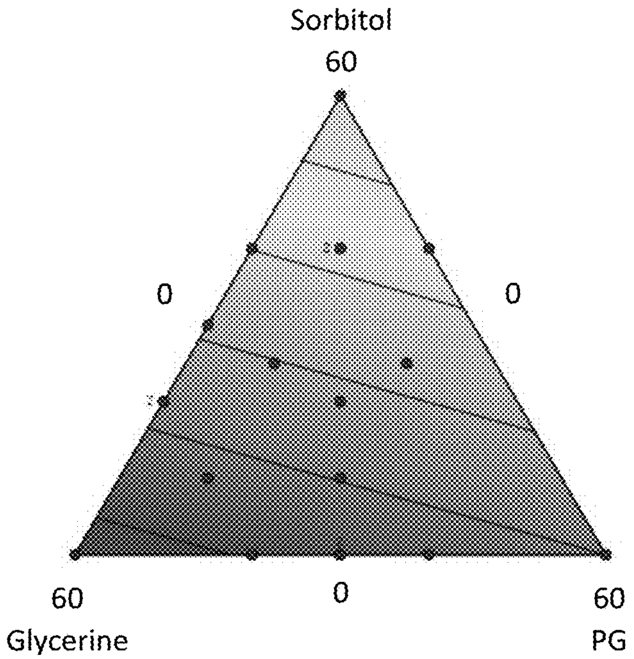
FIG. 4C shows a color ternary plot of the retained activity of nineteen exemplary amylase enzyme stored at 50° C. for 8 weeks, comparing the stability of the enzyme with three different polyols: sorbitol, glycerine, and propylene glycol, each with a TEA and citric acid buffer system.

The effect of different polyols and their concentrations on enzyme stability was evaluated in a TEA and citric acid buffer system. The polyols tested were sorbitol, glycerine, and propylene glycol. Nineteen enzyme compositions were prepared varying the concentration of the polyols in the concentration from between 0 wt. % and 60 wt. %; these concentrations are reflected by red dots in the ternary plots shown as FIGS. 4A-4C. The amount of enzyme and components in the buffer system were kept constant. Stability results for each of the enzymes tested (protease, amylase, and lipase) were collected. The formulations were stored at and 50° C. over a period of 8 weeks. Samples of each of the tested formulations were collected after 8 weeks. Assays were performed as described in Example 1. Three different enzymes were tested, a protease, a lipase, and an amylase. The compositions were stored at 50° C. for 8 weeks. The results of this testing are shown in FIGS. 4A (protease), 4B (lipase), and 4C (amylase). As can be seen in the figures, the enzymes exhibited the most stability with sorbitol, glycerine, or mixtures of sorbitol and glycerine; while propylene glycol provided some enzyme stability, it did not contribute as significantly as the other two polyols. The red areas show the highest retained activity with orange to green representing very good retained enzyme activity. The blue areas still provide improved retention of enzyme activity, but not has high as the green, orange and red sections. These results demonstrate that of the three poyols tested, sorbitol, glycerine, and mixtures of the two provide the highest retention of enzyme activity.

Example 9

Figure 5A:
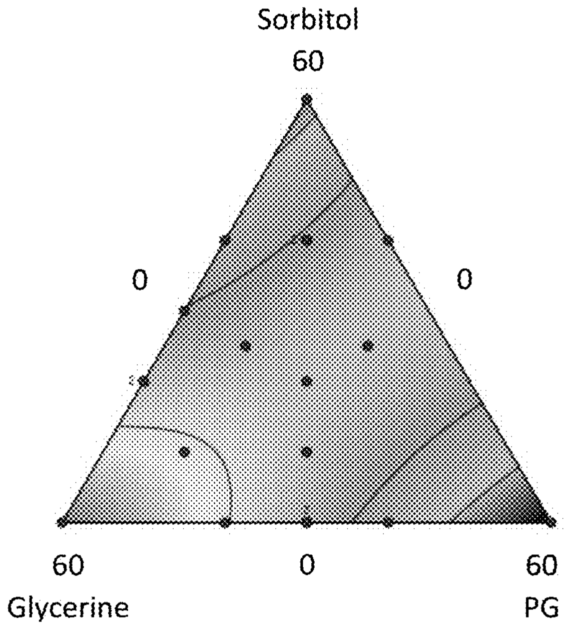
FIG. 5A shows a color ternary plot of the retained activity of nineteen exemplary protease enzyme stored at 40° C. for 8 weeks, comparing the stability of the enzyme with three different polyols: sorbitol, glycerine, and propylene glycol, each with a TEA and citric acid buffer system.
Figure 5B:
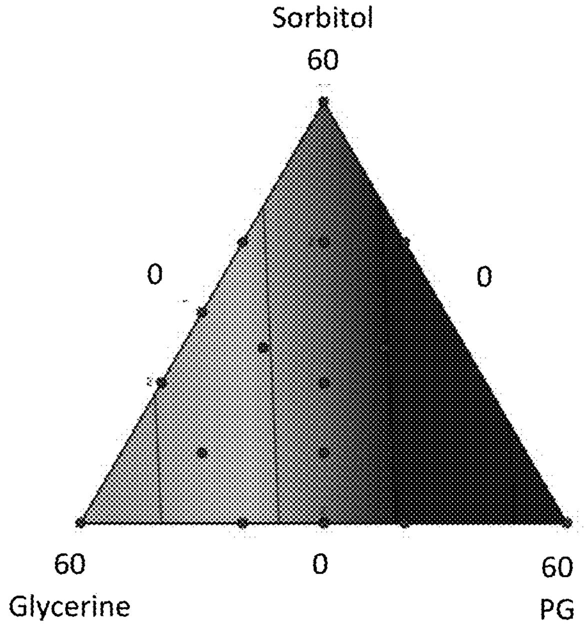
FIG. 5B shows a color ternary plot of the retained activity of nineteen exemplary protease enzyme stored at 50° C. for 8 weeks, comparing the stability of the enzyme with three different polyols: sorbitol, glycerine, and propylene glycol, each with a TEA and citric acid buffer system.

The effect of different polyols on enzyme in a TEA and citric acid buffer system was further tested at different temperatures to confirm the suitability of the polyols under different temperature conditions. Nineteen enzyme compositions were prepared varying the concentration of the polyols in the concentration from between 0 wt. % and 60 wt. %; these concentrations are reflected by red dots in the ternary plots shown as FIGS. 5A-5B. The amount of enzyme and components in the buffer system were kept constant. Stability results for each of the enzymes tested (protease, amylase, and lipase) were collected. The polyols tested were sorbitol, glycerine, and propylene glycol. A commercially available protease was tested. The compositions were stored at 40° C. and 50° C. for 8 weeks. Samples of each of the tested formulations were collected after 8 weeks. Assays were performed as described in Example 1. The results of this testing are shown in FIG. 5A (which shows the results of the 40° C. testing) and FIG. 5B (which shows the results of the 50° C. testing). The red areas show the highest retained activity with orange to green representing very good retained enzyme activity. The blue areas still provide improved retention of enzyme activity, but not has high as the green, orange and red sections. These results demonstrate that increased storage temperature has a deleterious effect on the enzyme stability, which is expected. Beneficially though, the plots also demonstrate improved retained enzyme activity based on the compositions disclosed herein.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A low-foaming, enzymatic liquid detergent composition comprising:

from about 10 wt. % to about 60 wt. % of a polyol, wherein the polyol is a mixture comprising glycerin, sorbitol and propylene glycol;

from about 1 wt. % to about 5 wt. % of an enzyme; wherein the enzyme comprises a protease, a lipase and an amylase;

from about 1 wt. % and about 15 wt. % of a buffer, wherein the buffer comprises a mixture of an alcohol amine and a C1-C6 polycarboxylic acid; wherein the alcohol amine comprises ethanolamine, wherein the C1-C6 polycarboxylic acid comprises citric acid;

from about 0.1 wt. % to about 10 wt. % of a preservative, wherein said preservative is an isothiazolinone; and from about 15 wt. % to about 75 wt. % water;

wherein the composition is a liquid and provides a pH of between about 6.5 and about 9.5 during use; wherein the composition during use provides about ½ of an inch or less of foam at about 40° C. after about 15 seconds; wherein the composition has less than 0.5 wt. % of borate containing compounds; wherein the composition has less than 0.5 wt. % of an amine oxide; and wherein the composition has less than 0.5 wt. % of an alkyl polyglucoside.

2. The composition of claim 1, wherein the polyol is in a concentration between about 15 wt. % and about 60 wt. %.

3. The composition of claim 1, wherein the enzyme is in a concentration of between about 2 wt. % and about 4 wt. %.

4. The composition of claim 3, wherein the enzyme is in a concentration between about 2 wt. % and about 3.5 wt. %.

5. The composition of claim 1, wherein the composition further comprises a corrosion inhibitor, a defoamer, a water conditioning agent, a short chain alkylbenzene and/or alkyl naphthalene sulfonate, or a combination thereof.

6. The composition of claim 5, wherein the water conditioning agent is a polyacrylic acid polymer.

7. The composition of claim 5, wherein the defoamer comprises an EO/PO block copolymer.

8. The composition of claim 1, wherein the composition has a pH of between about 7 and about 9.

9. The composition of claim 7, wherein the composition further comprises a C8-C13 branched alcohol alkoxylate.

10. A method of manufacturing the enzymatic detergent composition of claim 1 comprising:

combining and mixing the polyol; the enzyme; the buffer; and the water to form the detergent composition.

11. The method of claim 10, wherein the enzyme is combined and mixed last.

12. A method of cleaning a surface comprising:

diluting the composition of claim 1 to form a cleaning solution, wherein the cleaning solution has a concentration of between about 500 ppm to about 5000 ppm;

contacting the surface with the cleaning solution;

rinsing the surface with water.

13. The method of claim 12, wherein the contacting step comprises submerging the surface in the cleaning solution.

14. The method of claim 12, further comprising a presoak step prior to the contacting step.

15. The method of claim 12, wherein the diluting step is at a dilution ratio of between about 1/32 oz/gal and about 1 oz/gal.

16. The method of claim 12, wherein the surface is an instrument, wherein the instrument is soiled with blood and/or mammalian tissue; wherein the blood and/or mammalian tissue are removed from the instrument during the contacting and/or rinsing steps; wherein the contacting step is performed at a temperature between about 50° F. and about 150° F.; wherein the cleaning solution has a concentration of between about 1000 ppm and about 4000 ppm; and wherein the method further comprising a disinfecting step; and wherein the disinfecting step is performed with a sanitizer and/or at a temperature greater than about 200° F.

17. The method of claim 12, wherein the surface is ware; wherein the cleaning solution has a concentration of between about 100 ppm and about 5000 ppm; and wherein the contacting step is performed at a temperature between about 50° F. and about 180° F.

18. The method of claim 17, wherein the cleaning solution has a concentration of between about 250 ppm and about 2500 ppm; and wherein the cleaning solution has a pH of between about 6.5 and about 9.5; and wherein the cleaning solution provides about ½ of an inch or less of foam at about 40° C. after about 30 seconds.

* * * * *